United States Patent
Kazmi

(10) Patent No.: US 8,774,798 B2
(45) Date of Patent: Jul. 8, 2014

(54) DETERMINING CAPABILITY TO PROVIDE DYNAMIC LOCAL TIME UPDATES IN A PREPAID TERMINATING CALL

(75) Inventor: Mustafa Anwar Kazmi, Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 1142 days.

(21) Appl. No.: 11/846,299

(22) Filed: Aug. 28, 2007

(65) Prior Publication Data

US 2009/0061857 A1     Mar. 5, 2009

(51) Int. Cl.
*H04W 4/00*     (2009.01)
(52) U.S. Cl.
USPC ........ 455/433; 455/432.1; 455/418; 455/466; 455/432.3; 370/328; 370/338
(58) Field of Classification Search
USPC ........ 455/404.2, 406–409, 414.1, 432.1–433, 455/445, 456.1, 455, 405, 418, 466, 455/435.1–435.3; 379/114.06, 114.17, 379/114.27; 370/328–338
See application file for complete search history.

(56) References Cited

U.S. PATENT DOCUMENTS

| | | |
|---|---|---|
| 5,123,111 A | 6/1992 | Delory et al. |
| 5,353,335 A | 10/1994 | D'Urso et al. |
| 5,355,406 A | 10/1994 | Chencinski et al. |
| 5,448,633 A | 9/1995 | Jamaleddin et al. |
| 5,488,650 A | 1/1996 | Greco et al. |
| 5,493,608 A | 2/1996 | O'Sullivan |
| 5,511,114 A | 4/1996 | Stimson et al. |
| 5,537,594 A | 7/1996 | Shannon et al. |
| 5,592,535 A | 1/1997 | Klotz |
| 5,621,731 A | 4/1997 | Dale et al. |
| 5,722,067 A | 2/1998 | Fougnies et al. |
| 5,737,393 A | 4/1998 | Wolf |
| 5,737,701 A | 4/1998 | Rosenthal et al. |
| 5,771,276 A | 6/1998 | Wolf |
| 5,812,639 A | 9/1998 | Bartholomew et al. |
| 5,867,570 A | 2/1999 | Bargout et al. |

(Continued)

FOREIGN PATENT DOCUMENTS

| | | |
|---|---|---|
| EP | 1030506 | 8/2000 |
| EP | 1039764 | 9/2000 |

(Continued)

OTHER PUBLICATIONS

Mouly, Michel and Pautet, Marie-Bernadette, "The GSM System," France, 1992, pp. 569-577.

(Continued)

*Primary Examiner* — Quan M Hua
(74) *Attorney, Agent, or Firm* — Abel Law Group, LLP

(57) ABSTRACT

A method and system for setting a charging rate for a terminating call to a prepaid mobile subscriber in a telecommunications network is provided. A query from a GMSC to a mobile subscriber's HLR returns information from a VMSC where the mobile subscriber is registered, including local time information for the MSC where the mobile subscriber is registered. The local time information can be included in an Initial Detection Point at call setup so that a peak or off-peak rate for the call can be set. Additional messaging between the GMSC and the VMSC/VLR can determine the capability of the VMSC/VLR to provide updated local time information for the duration of the call.

9 Claims, 13 Drawing Sheets

(56) References Cited

U.S. PATENT DOCUMENTS

| | | | |
|---|---|---|---|
| 5,946,380 A | 8/1999 | Cohen et al. | |
| 5,978,456 A | 11/1999 | Takeuchi et al. | |
| 5,991,407 A | 11/1999 | Murto | |
| 5,991,748 A | 11/1999 | Taskett | |
| 5,995,822 A | 11/1999 | Smith et al. | |
| 6,014,428 A | 1/2000 | Wolf | |
| 6,018,652 A | 1/2000 | Frager et al. | |
| 6,037,880 A | 3/2000 | Manion | |
| 6,058,300 A | 5/2000 | Hanson | |
| 6,061,433 A | 5/2000 | Polcyn et al. | |
| 6,070,067 A | 5/2000 | Nguyen et al. | |
| 6,075,855 A | 6/2000 | Christiansen et al. | |
| 6,115,601 A | 9/2000 | Ferreira | |
| 6,122,510 A | 9/2000 | Granberg | |
| 6,144,847 A | 11/2000 | Altschul et al. | |
| 6,144,938 A | 11/2000 | Surace et al. | |
| 6,157,823 A | 12/2000 | Fougnies et al. | |
| 6,167,251 A | 12/2000 | Segal et al. | |
| 6,169,975 B1 | 1/2001 | White et al. | |
| 6,181,785 B1 | 1/2001 | Adams et al. | |
| 6,185,414 B1 | 2/2001 | Brunner et al. | |
| 6,185,545 B1 | 2/2001 | Resnick et al. | |
| 6,188,752 B1 | 2/2001 | Lesley | |
| 6,195,543 B1 | 2/2001 | Granberg | |
| 6,201,856 B1 | 3/2001 | Orwick et al. | |
| 6,205,326 B1 | 3/2001 | Tell et al. | |
| 6,236,851 B1 | 5/2001 | Fougnies et al. | |
| 6,240,284 B1 | 5/2001 | Bugnon et al. | |
| 6,253,072 B1 | 6/2001 | Verdonk | |
| 6,256,504 B1 | 7/2001 | Tell et al. | |
| 6,327,363 B1 | 12/2001 | Henderson et al. | |
| 6,333,976 B2 | 12/2001 | Lesley | |
| 6,345,181 B1 | 2/2002 | Janhonen et al. | |
| 6,363,411 B1 | 3/2002 | Dugan et al. | |
| 6,373,930 B1 | 4/2002 | McConnell et al. | |
| 6,377,938 B1 | 4/2002 | Block et al. | |
| 6,393,269 B1* | 5/2002 | Hartmaier et al. | 455/406 |
| 6,397,055 B1 | 5/2002 | McHenry et al. | |
| 6,404,869 B1 | 6/2002 | Henderson et al. | |
| 6,404,880 B1 | 6/2002 | Stevens | |
| 6,411,803 B1 | 6/2002 | Malackowski et al. | |
| 6,424,706 B1 | 7/2002 | Katz et al. | |
| 6,424,840 B1 | 7/2002 | Fitch et al. | |
| 6,434,126 B1 | 8/2002 | Park | |
| 6,463,130 B1 | 10/2002 | Malik | |
| 6,480,710 B1 | 11/2002 | Laybourn et al. | |
| 6,487,277 B2 | 11/2002 | Beyda et al. | |
| 6,487,401 B2 | 11/2002 | Suryanarayana et al. | |
| 6,490,450 B1 | 12/2002 | Batni et al. | |
| 6,493,547 B1 | 12/2002 | Raith | |
| 6,496,690 B1 | 12/2002 | Cobo et al. | |
| 6,496,691 B1 | 12/2002 | Easley et al. | |
| 6,507,644 B1 | 1/2003 | Henderson et al. | |
| 6,516,190 B1 | 2/2003 | Linkola | |
| 6,526,273 B1 | 2/2003 | Link, II et al. | |
| 6,542,601 B1 | 4/2003 | Hernandez et al. | |
| 6,567,657 B1 | 5/2003 | Holly et al. | |
| 6,594,484 B1 | 7/2003 | Hitchings, Jr. | |
| 6,625,268 B1 | 9/2003 | Wallenius | |
| 6,625,439 B2 | 9/2003 | Laybourn et al. | |
| 6,628,951 B1* | 9/2003 | Grohn et al. | 455/445 |
| 6,671,506 B1 | 12/2003 | Lee | |
| 6,671,523 B1 | 12/2003 | Niepel et al. | |
| 6,684,072 B1 | 1/2004 | Anvekar et al. | |
| 6,705,520 B1 | 3/2004 | Pitroda et al. | |
| 6,728,353 B1 | 4/2004 | Espejo et al. | |
| 6,741,687 B1 | 5/2004 | Coppage | |
| 6,748,066 B1 | 6/2004 | Espejo et al. | |
| 6,771,950 B1 | 8/2004 | Shupe et al. | |
| 6,904,035 B2 | 6/2005 | Requena | |
| 6,912,383 B1 | 6/2005 | Li et al. | |
| 6,934,529 B2 | 8/2005 | Bagoren et al. | |
| 6,950,876 B2 | 9/2005 | Bright et al. | |
| 6,957,058 B2 | 10/2005 | Chan et al. | |
| 6,975,852 B1* | 12/2005 | Sofer et al. | 455/408 |
| 6,987,969 B1 | 1/2006 | Brunig et al. | |
| 7,050,811 B2 | 5/2006 | Grech et al. | |
| 7,088,987 B1 | 8/2006 | Espejo et al. | |
| 7,123,703 B2 | 10/2006 | Hausmann et al. | |
| 7,133,685 B2 | 11/2006 | Hose et al. | |
| 7,184,748 B2 | 2/2007 | Espejo et al. | |
| 7,209,890 B1 | 4/2007 | Peon et al. | |
| 7,215,942 B1 | 5/2007 | McQuaide, Jr. et al. | |
| 7,231,201 B2 | 6/2007 | Espejo et al. | |
| 7,280,645 B1 | 10/2007 | Allen et al. | |
| 7,330,110 B1 | 2/2008 | Heintzman et al. | |
| 7,356,328 B1 | 4/2008 | Espejo et al. | |
| 7,428,510 B2 | 9/2008 | Titus et al. | |
| 7,463,889 B1 | 12/2008 | DiPrima et al. | |
| 7,466,806 B2 | 12/2008 | Espejo et al. | |
| 7,480,710 B1 | 1/2009 | Olson et al. | |
| 7,529,538 B2 | 5/2009 | Espejo et al. | |
| 7,539,629 B1 | 5/2009 | Peon et al. | |
| 7,609,682 B2 | 10/2009 | Ang et al. | |
| 7,653,377 B1 | 1/2010 | Espejo et al. | |
| 7,706,792 B1 | 4/2010 | DiPrima et al. | |
| 7,787,860 B2 | 8/2010 | Espejo et al. | |
| 2001/0001321 A1 | 5/2001 | Resnick et al. | |
| 2001/0028705 A1 | 10/2001 | Adams et al. | |
| 2001/0031636 A1* | 10/2001 | Hanson | 455/432 |
| 2001/0049656 A1* | 12/2001 | Halkosaari et al. | 705/39 |
| 2002/0029189 A1 | 3/2002 | Titus et al. | |
| 2002/0077829 A1 | 6/2002 | Brennan et al. | |
| 2002/0091572 A1 | 7/2002 | Anderson et al. | |
| 2002/0103762 A1 | 8/2002 | Lopez et al. | |
| 2002/0104090 A1 | 8/2002 | Stettner | |
| 2002/0107007 A1 | 8/2002 | Gerson | |
| 2002/0107738 A1 | 8/2002 | Beach et al. | |
| 2002/0111153 A1 | 8/2002 | Hartmaier et al. | |
| 2002/0115424 A1 | 8/2002 | Bagoren et al. | |
| 2002/0143634 A1 | 10/2002 | Kumar et al. | |
| 2002/0147658 A1 | 10/2002 | Kwan | |
| 2002/0156683 A1 | 10/2002 | Stoutenburg et al. | |
| 2002/0181710 A1 | 12/2002 | Adam et al. | |
| 2002/0193093 A1 | 12/2002 | Henrikson et al. | |
| 2002/0193100 A1 | 12/2002 | Riffe et al. | |
| 2003/0002635 A1 | 1/2003 | Koch et al. | |
| 2003/0026404 A1 | 2/2003 | Joyce et al. | |
| 2003/0037176 A1 | 2/2003 | Dannehr et al. | |
| 2003/0095566 A1 | 5/2003 | Bunting et al. | |
| 2003/0119477 A1 | 6/2003 | Uppal et al. | |
| 2003/0125042 A1 | 7/2003 | Olrik et al. | |
| 2003/0126020 A1 | 7/2003 | Smith et al. | |
| 2003/0143978 A1 | 7/2003 | Cooper | |
| 2003/0157925 A1 | 8/2003 | Sorber et al. | |
| 2003/0158960 A1 | 8/2003 | Engberg | |
| 2004/0048599 A1 | 3/2004 | Kotaluoto et al. | |
| 2004/0063423 A1 | 4/2004 | Kagay, Jr. | |
| 2004/0076145 A1* | 4/2004 | Kauhanen et al. | 370/352 |
| 2004/0097229 A1* | 5/2004 | Muhonen et al. | 455/435.1 |
| 2004/0103191 A1 | 5/2004 | Larsson | |
| 2004/0132449 A1 | 7/2004 | Kowarsch | |
| 2004/0185828 A1 | 9/2004 | Engelhart | |
| 2004/0202187 A1* | 10/2004 | Kelly et al. | 370/401 |
| 2004/0228457 A1 | 11/2004 | Espejo et al. | |
| 2005/0009499 A1 | 1/2005 | Koster | |
| 2005/0075106 A1 | 4/2005 | Jiang | |
| 2005/0101292 A1 | 5/2005 | Fukui | |
| 2005/0148319 A1 | 7/2005 | Himeno | |
| 2005/0164707 A1 | 7/2005 | Batni et al. | |
| 2005/0250493 A1* | 11/2005 | Elkarat et al. | 455/432.1 |
| 2005/0250501 A1 | 11/2005 | Mobin et al. | |
| 2005/0262355 A1 | 11/2005 | Banet et al. | |
| 2006/0003736 A1 | 1/2006 | Chan et al. | |
| 2006/0003766 A1* | 1/2006 | Parameswar et al. | 455/433 |
| 2006/0008063 A1 | 1/2006 | Harnesk et al. | |
| 2006/0023856 A1 | 2/2006 | Welton | |
| 2006/0058010 A1 | 3/2006 | Williams et al. | |
| 2006/0058049 A1 | 3/2006 | McLaughlin et al. | |
| 2006/0073808 A1 | 4/2006 | Buchert | |
| 2006/0240820 A1 | 10/2006 | Jiang | |
| 2006/0240822 A1 | 10/2006 | Jiang | |
| 2006/0258331 A1* | 11/2006 | Syrett et al. | 455/405 |
| 2007/0049247 A1 | 3/2007 | Espejo et al. | |

(56) References Cited

U.S. PATENT DOCUMENTS

| | | | |
|---|---|---|---|
| 2007/0106569 A1 | 5/2007 | McQuaide et al. | |
| 2007/0205263 A1 | 9/2007 | Peon et al. | |
| 2007/0281687 A1* | 12/2007 | Jiang | 455/433 |
| 2008/0014933 A1* | 1/2008 | Montz et al. | 455/433 |
| 2008/0096525 A1 | 4/2008 | Engelhart | |
| 2008/0119162 A1 | 5/2008 | Sivalingam et al. | |
| 2008/0207181 A1* | 8/2008 | Jiang | 455/414.1 |
| 2008/0261559 A1 | 10/2008 | Cai et al. | |
| 2008/0299967 A1 | 12/2008 | Kazmi | |
| 2008/0318545 A1 | 12/2008 | Kazmi | |
| 2009/0029673 A1 | 1/2009 | Hamadi et al. | |
| 2009/0061815 A1 | 3/2009 | Myers et al. | |
| 2009/0061818 A1 | 3/2009 | Myers et al. | |
| 2009/0061856 A1 | 3/2009 | Kazmi | |
| 2009/0061868 A1 | 3/2009 | Kazmi | |
| 2009/0081988 A1 | 3/2009 | Kazmi | |
| 2009/0234747 A1 | 9/2009 | Peon et al. | |
| 2010/0105369 A1 | 4/2010 | DiPrima et al. | |

FOREIGN PATENT DOCUMENTS

| | | |
|---|---|---|
| EP | 1372089 | 12/2003 |
| WO | 9216078 | 9/1992 |
| WO | 9821874 | 5/1998 |
| WO | 9918713 | 4/1999 |
| WO | 0025507 | 5/2000 |
| WO | 0019702 | 6/2000 |

OTHER PUBLICATIONS

Zahid Ghadialy, "CAMEL: An Introduction," Jul. 25, 2005, 11 pages.

David G. Smith, "An Introduction to GSM Enhancements for Operator Specific Services (CAMEL),", The Institution of Electrical Engineers, 1996, 9 pages.

3GPP TS 02.78 v7.2.0 (Dec. 2001) Technical Specification, "3rd Generation Partnership Project; Technical Specification Group Services and System Aspects; (CAMEL); Service definition—State 1 (Release 1998)," GSM® Global System for Mobile Communications, 34 pages.

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

ITU-T Recommendation Q.762, "Signalling System No. 7—ISDN User Part general functions of messages and signals," International Telecommunications Union, Dec. 1999, 30 pages, URL: <https://staff.hti.bfh.ch/mdm1/Kursunterlagen/SS7/T-REC-Q.762.pdf>.

ITU-T Recommendation Q.763, "Signalling System No. 7—ISDN User Part formats and codes," International Telecommunications Union, Dec. 1999, 134 pages, URL: <https://staff.hti.bfh.ch/mdm1/Kursunterlagen/SS7/T-REC-Q.763.pdf>.

Kislak, Ali, "'CAMEL,' 'Customised Applications for Mobile network Enhanced Logic,'" CAMEL & IN, Demo Version 1.0, Jan. 19, 2002, 18 pages, retrieved Nov. 17, 2004 from URL: http://www.hotel-fiesta.com/4g-aliweb/MyDOCS/CAMELMExEin/CAMELin.htm.

3rd Generation Partnership Project; Technical Specification Group Core Network; Customised Applications for Mobile Newtork Enhanced Logic (CAMEL) Phase 4: CAMEL Application Part (CAP) specification (Release 5), 3GPP TS 29.078 5.0.0 (Jun. 2002), 222 pages.

Cloward, William H., "Sophisticated, High Speech Capacity Voice Response Application for End Users," Official Proceedings of Speech Tech '86, Media Dimensions, Inc., Apr. 30, 1986, pp. 58/61.

Levy, Ira D., "Keeping the bells ringing: Account replenishment in near real time", TMA Journal, v19n2, p. 24-26, Mar./Apr. 1999.

Moshavi, Sharon, "Please Deposit No Cents," Forbes, Aug. 16, 1993, 1 page.

International Search Report and Written Opinion, mailed Feb. 9, 2009, for App. No. PCT/US2008/056385 (Publication No. WO-2008/150560) published Dec. 11, 2008 8 pages.

Meskauskas, P., Customised Applications for Mobile Enhanced Logic (CAMEL), Research Seminar on Nomadic Computing, Department of Computer Science, University of Helsinki, 1999, 18 pages.

* cited by examiner

DETERMINING CAPABILITY TO PROVIDE DYNAMIC LOCAL TIME UPDATES IN A PREPAID TERMINATING CALL

FIELD OF ART

Aspects and features described herein relate to use of CAMEL triggers in a mobile communications system.

BACKGROUND

The use of mobile communications devices has become commonplace in today's society. As consumers of mobile communications services become more sophisticated, it becomes more important for service providers to offer more and better services in order to fully meet their subscribers' needs. Such value-added services have become an integral part of the consumer's expectations regarding their mobile communications service.

Many of these value-added services relate to the provision of Intelligent Network (IN) services such as video or music download services, automated call forwarding services, ringback tone services, prepaid services and the like. In the Global System for Mobile Communications (GSM), the Customized Application of Mobile Enhanced Logic (CAMEL) standard has been developed to aid GSM operators to offer operator-specific services to their subscribers, even if a subscriber is roaming outside their home network. These services can include call processing functions such as caller ID and call screening, call forwarding, call rerouting; charging functions such as location-based charging or personal discounts; and provision of tones and announcements to provide information regarding a call to a subscriber's mobile telephone.

CAMEL protocol is defined in a set of standards established by the ETSI (European Telecommunication Standardization Institute) and later upgraded as part of 3GPP (Third Generation Partnership Project) initiative. These standards can be found at http://webapp.etsi.org/key/queryform.asp and are incorporated by reference herein in their entirety. Additional information regarding CAMEL protocol and operations can be found in many publications. The most comprehensive work on CAMEL including the latest standardization enhancements can be found in the book titled *CAMEL, Intelligent Network for the GSM, GPRS and UMTS Networks* by Rogier Noldus, published by John, Wiley & Sons Limited (2006). Other publications that describe the architecture and operation of a mobile network using CAMEL functionality include is the publication entitled "Customised Applications for Mobile Enhanced Logic (CAMEL)," by Paulius Meskauskas for the Research Seminar on Nomadic Computing for the Department of Computer Science at the University of Helsinki; the CAMEL tutorial by Zahid Ghadialy entitled "CAMEL: An Introduction," (Jul. 25, 2004), available on the World Wide Web at http://www.3g4g.co.uk/Tutorial/ZG/zg_camel.html; and "An Introduction to GSM Enhancements for Operator Specific Services (CAMEL)" (1996) by David G. Smith, published by the IEEE, Savoy Place, London. Information regarding CAMEL triggers and trigger detection points may also be found in U.S. Patent documents such as, for example, U.S. Pat. No. 7,050,811 to Grech et al. and U.S. patent application Publication No. 2003/0095566 to Bunting et al. Each of these documents is incorporated by reference herein as to their entirety.

Information regarding CAMEL networks may also be found in U.S. patent application Ser. No. 11/754,808 entitled "Optimized Camel Triggering for Prepaid Calling," filed May 29, 2007; U.S. patent application Ser. No. 11/765,655 entitled "Conditional Call Treatment For Prepaid Calls," filed Jun. 20, 2007; and U.S. patent application Ser. No. 11/781,459 filed Jul. 23, 2007, each of which shares at least one common inventor with the present application and each of which is hereby expressly incorporated by reference herein in its entirety.

Processing of a call in a CAMEL network can be accomplished by means of signaling between one or more of a subscriber's Home Location Register (HLR), a visiting Location Register (VLR) associated with the Mobile Switching Center (MSC) where the mobile subscriber is currently located, a Gateway Mobile Switching Center (GMSC), and a Service Control Point (SCP). CAMEL works to enable the provision of enhanced mobile services by providing CAMEL Application Part (CAP) messages, for communication between an SCP and an MSC handling an outgoing call or a GMSC handling an incoming call.

CAMEL also provides a Basic Call State Model (BCSM), which describes the different phases of call processing in the MSC. An Originating Basic Call State Model (O-BCSM) describes the call processing for a mobile-originated call, i.e., a call where the calling party is originating a call from her mobile device. Similarly, a Terminating Basic Call State Model (T-BCSM) describes the call processing to route a terminating call to the mobile subscriber as a recipient of an incoming call. Both the O-BCSM and T-BCSM contain various points in the call processing between the MSC and the SCP. Each state is preceded by a transition step, or Detection Point (DP) where the call is handed over to the SCP for a determination whether the call can proceed to the next state.

Control of a call in a CAMEL network can be managed by the SCP and the MSC or GMSC through the use of DPs (both TDPs and EDPs) and CAP operations. A CAP operation message from the SCP to the MSC can contain instructions regarding the handling of the call at that point or from that point onward. For example, Operation: RequestReportBCSMEvent is used to arm future DPs which contain instructions for future processing. CAP operations also are used to send messages between the MSC and the SCP regarding a status of the call. For example, an operation such as Operation: EventReportBCSMEvent can be used by the MSC to report to the SCP that the call has been answered.

One of the services provided in a CAMEL network is prepaid mobile service, both for mobile originators and mobile recipients of calls in the mobile system. Prepaid mobile service is a popular option for many users. It can enable a user to enjoy the benefits of mobile communications without having to enter into a long-term contract. Prepaid mobile service also can be useful to facilitate management of mobile service. For example, prepaid service can be used to as a parental control tool to manage a child's use of mobile telecommunications services. Prepaid service also can be used by businesses as a management tool to monitor and control corporate use of mobile resources.

CAMEL also can assist in the provision of time-based services in a mobile telecommunications network. For example, a mobile subscriber can receive specialized services from her mobile service provider based on information regarding the subscriber at a particular time or can receive different services depending on whether she is in a particular location at a particular time. Consequently, it can be important to obtain current location and/or local time information regarding the subscriber so that such services can be provided.

One common time-based service is the provision of a different charging schedule for the call depending on the time.

Such time-based charging, often embodied in peak/off-peak pricing wherein a call made or received at a "peak" time is charged at a higher rate than one at an "off-peak" time, requires that the SCP and the rating engine, which is part of a Prepaid Platform, have accurate information regarding a time associated with the mobile subscriber, such as the local time of the subscriber and a difference between the subscriber's local time and a standard time such as Greenwich Mean Time. The local time can also decide the eligibility of a subscriber to make or receive a call. For example, a prepaid subscriber may not have sufficient funds in her prepaid account to be eligible to make or receive a call charged at a "peak" rate but may have sufficient funds for an "off-peak" call. Alternatively, parents may want to limit a child's telephone usage during night time or school hours, and so can set their service so that the child's mobile device is ineligible to make or receive all but specific allowed calls during those hours.

There are several ways in which the SCP can obtain local time information at call setup. For a mobile originating call, the MSC where the call is set up can report its local time to the SCP in the CAP operation Initial Detection Point (IDP), irrespective of whether the subscriber is in a CAMEL Phase 2 or Phase 3 system. For a mobile terminating call, however, the process to provide the SCP with the subscriber's local time differs depending on whether the subscriber is in a CAMEL Phase 2 or a CAMEL Phase 3 system. In a CAMEL Phase 3 system, a mobile terminating call can be handled by a Visited MSC where the mobile subscriber is located, and thus also can report its local time to the SCP in the IDP operation.

In a mobile terminating call in a CAMEL Phase 2 system, however, the GMSC which initiates the CAP Dialogue with the SCP does not have information on which time zone the subscriber is currently visiting. Instead, the SCP or Prepaid Platform maintains a database which lists the time zone of each VLR. The database can also list the time zone of each location if the VLR covers more than one time zone. A location can be marked by a Cell Global ID or a Location Area Code, commonly known as LAC in GSM terminology. When the SCP receives the location information in the CAMEL operation IDP, the SCP or Prepaid platform can look up the local time information for this location and calculate the rate and eligibility based on the local time of the subscriber.

It can also be desirable for the SCP to receive updated local time information during the course of the call. For example, a subscriber may begin a call at a time subject to a "peak" charging rate but continue the call to a time subject to an "off-peak" rate. If a moving mobile subscriber remains in a single time zone, for example, the Eastern Standard Time Zone in the Eastern United States, her updated local time at any moment in a call is simply calculated from the call duration. However, a moving mobile subscriber may also move from time zone to time zone during the call, for example, by crossing the state line between Georgia, which is in the Eastern Time Zone, and Alabama, which is in the Central Time Zone. In such a case, the subscriber's local time can change from a time at which a "peak" rate would be charged to an "off-peak" time even if the rate would not change if she remained in a single time zone.

One way the SCP can obtain updated information regarding a mobile subscriber is by a conventional MAP (Mobile Application Part) Any Time Interrogation (ATI) operation. In an ATI operation, the SCP queries the HLR associated with the subscriber for information regarding the subscriber such as subscriber location and subscriber state. The HLR then queries the VLR where the subscriber is registered via a MAP Provide Subscriber Information (PSI) query to obtain information regarding the subscriber. In conventional CAMEL systems, this information can include the identification of the VLR where the subscriber is registered, a Cell Global Identifier, location information such as Geographical Information, and age of the location information. The information provided by the VLR can also include information regarding the subscriber state (e.g., busy, idle, or not available). The VLR returns this information to the HLR via a MAP PSI Response, and the HLR in turn provides this information to the SCP via a MAP ATI Response so that the SCP has up-to-date location and state information regarding a subscriber. SCP or the rating engine can use that information to search the database mentioned earlier to derive the local time and the corresponding time zone information associated with that location.

Another means of obtaining this local time information is described in U.S. patent application Publication No. 2006/0003766 to Parameswar et al. Parameswar describes a method and system for obtaining local time information for use in provision of time-based services. In Parameswar, a query similar to an ATI query is utilized, wherein a servicing entity such as the SCP queries the HLR for the mobile station's current location and time zone information. The HLR in turn queries the mobile station's current VLR for the relevant information and upon receipt of the information from the VLR, transmits the information to the querying servicing entity.

Both of these methods require a query from the SCP to the HLR, a query from the HLR to the VLR, and return messages from the VLR to the HLR and from the HLR to the SCP.

In CAMEL Phase 3, it is possible to also provision a set of information that can control the terminating call at a Visited MSC. This set of information, known as "VT-CSI", can include the set of TDPs that can intercept the processing of a terminating call towards the subscriber and a set of parameters to control the actions at each of these TDPs. In such a system, the SCP can receive updated location and time information from the VMSC during the call as part of its periodic messaging to the SCP. However, in order for a call to be handled in this way by CAMEL Phase 3, all roaming partners also must be operating using CAMEL Phase 3. If a roaming partner does not have CAMEL Phase 3 but instead has, for example, CAMEL Phase 2, conventional CAMEL call processing does not permit the provision of such local time updates to the SCP.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Aspects and features described herein relate to a method and system for provision of local time information in a call received by a prepaid mobile subscriber. According to one or more aspects described herein, in a Mobile Terminating call, the Visiting MSC (VMSC) where the mobile subscriber is located can include its local time or time zone as a parameter in the information sent to the HLR during terminating call set up. The HLR can then send this information to the GMSC, which in turn can send this information to the SCP as part of the CAP operation Initial Detection Point for the terminating call.

In an embodiment according to one or more aspects herein, the SCP also can receive updated local time information during the call. In accordance with conventional methods, SCP can allocate a charging time period for a terminating call and can instruct the GMSC to monitor for the expiration of that time period. According to aspects herein, a message from the GMSC to the SCP reporting the expiration of the time period can also contain information regarding an updated local time for the prepaid mobile subscriber. Thus, according to one or more aspects, a charge for the next segment of the terminating call can be calculated and an eligibility of the subscriber to continue the call can be determined according to the mobile subscriber's local time for that call segment. The granularity of this time-based charging can be varied by changing the charging limit time period and thus changing the time period between the reporting of local time updates.

In alternative embodiments according to aspects described herein, a mobile subscriber's reported location and time information can indicate that a charging rate for the terminating mobile subscriber probably will not change during the call. In such a case, the SCP can advise the GMSC that it does not need to receive updated location or local time information during the call. In accordance with one or more aspects therein, the SCP can make this determination either at call set-up, based on the location and time information reported at call set up, or during the call processing, based on location and time information reported during the call.

It may be noted that in the case of a Mobile Originating call, local time information can be provided to the SCP in accordance with conventional call processing methods, both at call set-up and throughout the duration of the call. Thus, in a Mobile Originating call processed in accordance with conventional methods, the MSC can report the originating caller's local time in the CAP operation Initial Detection Point (IDP) sent by the MSC to the SCP during the call setup phase and in periodic messages, such as CAP ApplyChargingReport messages, sent from the MSC to the SCP during the call.

DETAILED DESCRIPTION

The aspects and features summarized above can be embodied in various forms. The following description shows, by way of illustration, combinations and configurations in which the aspects can be practiced. It is understood that the described aspects, features, and/or embodiments are merely examples, that other aspects, features, and/or embodiments can be utilized, and that structural and functional modifications can be made, without departing from the scope of the present disclosure. In addition, although the aspects herein are described in the context of a particular Basic Call State Model using particular nomenclature for the steps and operations therein, it should be noted that variations in call state configurations and protocols may be used to process prepaid mobile calls in a CAMEL network and that such variations in configuration and protocol are within the scope of the present disclosure.

Figure 1:
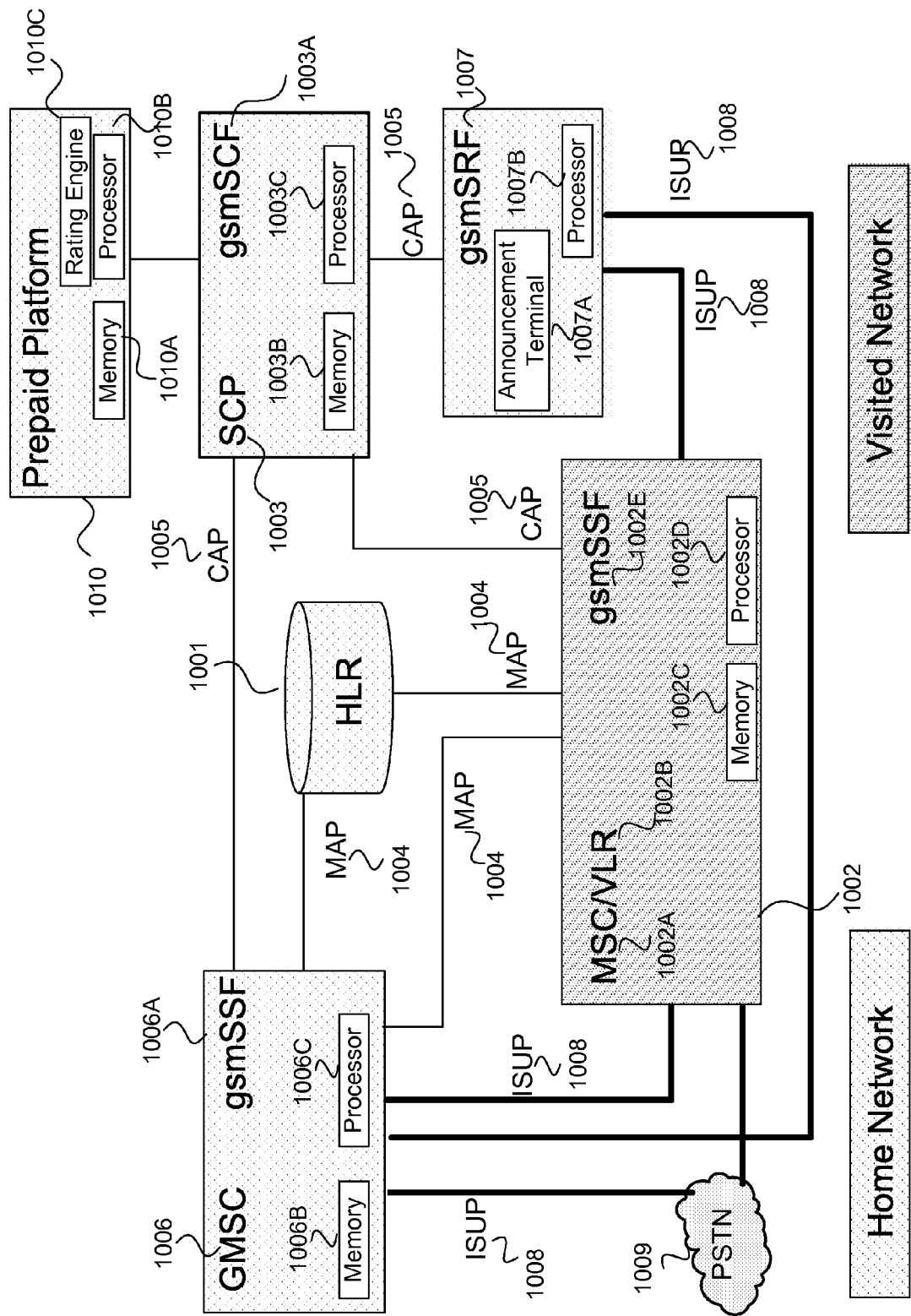
FIG. 1 is a block diagram depicting network elements in an exemplary CAMEL network in accordance with one or more aspects herein.

FIG. 1 depicts exemplary network elements that can be utilized to process a call in a CAMEL network in accordance with one or more aspects herein. Signaling for call set up and call tear-down between network elements shown in FIG. 1 can be accomplished using ISDN User Part (ISUP) 1008, which is a part of the Signaling System #7 (SS7) communications protocol for signaling originating and terminating switching locations of telephone calls in a Public Switched Telephone Network (PSTN) 1009.

As shown in the configuration depicted in FIG. 1, a CAMEL network can include a Home Location Register (HLR) 1001, which can hold the CAMEL Subscription Information (CSI) for each subscriber in the CAMEL network. The CSI for a subscriber can include subscription information regarding call processing and call feature enhancements. The set of information provisioned in the HLR for the control of a mobile originating call is known as O-CSI. This includes the set of TDP that can intercept the processing of an originating call and also includes a set of parameters to control the actions at each of those TDPs. In a similar manner, the set of information provisioned in the HLR for the control of a terminating call to a mobile subscriber as recipient of the call is known as "T-CSI." The T-CSI for a terminating mobile subscriber can include the set of TDPs that can intercept the processing of a terminating call towards that subscriber and a set of parameters to control the actions at each of those TDPs. T-CSI is used by GMSC to intercept and control a terminating Call. In CAMEL Phase 3, it is possible also to provision a set of information that can control the terminating call at a Visited MSC. This set of information, known as "VT-CSI", can include the set of TDPs that can intercept the processing of a terminating call towards the subscriber and a set of parameters to control the actions at each of these TDPs.

The exemplary CAMEL network shown in FIG. 1 can include a Mobile Switching Center/Visiting Location Register (MSC/VLR) 1002. The MSC/VLR 1002 can include a Mobile Switching Center (MSC) 1002A, memory 1002C, and processor 1002D that can receive and process a mobile subscriber's request to make a call, and a database of roaming mobile subscribers within the MSC's service area, which can be known as a Visiting Location Register (VLR) 1002B. When a mobile subscriber enters an area served by MSC 1002A, the subscriber's location can be updated in the HLR to point to VLR 1002B. During such an update, VLR 1002B also can be updated via Mobile Application Part (MAP) 1004 to include the subscriber's Originating CAMEL Subscription Information (O-CSI) from HLR 1001. If a subscriber is provisioned with the CAMEL Phase 3 'Visited MSC Terminating CAMEL Subscription Information' (VT-CSI), VLR 1002B can also be updated with her VT-CSI. MSC 1002A can then use the visiting mobile subscriber's O-CSI to govern processing of an outgoing mobile call originated by the subscriber.

The exemplary CAMEL network shown in FIG. 1 can also include Service Control Point (SCP) 1003, which can include a memory 1003A and a processor 1003B. In accordance with aspects herein, the address for the SCP in a subscriber's home network can be part of the subscriber's O-CSI obtained during an update of the VLR. During outgoing call setup for a mobile subscriber, MSC/VLR 1002 can contact SCP 1003 using GSM Service Switching Function (gsmSSF) 1002E by way of CAMEL Application Part (CAP) protocol 1005, to inform SCP 1003 that the caller is a CAMEL subscriber and that the call should be processed by Service Control Function gsmSCF 1003A.

In accordance with one or more aspects herein, MSC/VLR 1002 can also report a location and a local time of a mobile subscriber to SCP 1003. For example, the identity and local time of the MSC initiating the call is reported to SCP 1003 during set-up of an outgoing call. SCP 1003 and Prepaid Platform 1010 can use this information, for example, to determine an eligibility of a prepaid subscriber to make an outgoing call or to set a rate to be charged for the call. In addition, MSC/VLR 1002 can report location and local time information to SCP 1003 as part of one or more control messages from MSC/VLR 1002 to SCP 1003. For example, in accordance with cellular telephone processing aspects known in the art, each time a subscriber moves to a new cell, her device is registered with that cell, which is identified by a Cell Global ID (CGI). Multiple cells define a larger area, which can be identified by a Location Area Code (LAC). Thus, a location update by a mobile subscriber to the MSC/VLR can include location and local time information regarding the cell where the device is registered (CGI), a larger area encompassing multiple cells (LAC), and an even larger area served by the MSC where she is registered. This locality and local time information can then be reported by MSC 1002 to SCP 1003 for use in processing a call in accordance with aspects herein. For example, updated local time information can be used to determine an eligibility of a prepaid subscriber to continue the outgoing prepaid call, as in the case where a subscriber has a "curfew" on her eligibility to make calls. In addition, in accordance with one or more aspects described herein, updated local time information received at the end of one call segment can be used to determine an eligibility to continue the call or set a rate to be charged for a subsequent call segment.

The exemplary CAMEL network shown in FIG. 1 also depicts network elements that can be used to process an incoming call to a CAMEL mobile subscriber as a terminating party to the call. As is known in the art, when a call is made to a mobile user in the network, the call can be received by a Gateway Mobile Switching Center 1006, which also includes GSM Service Switching Function (gsmSSF) 1006A, memory 1006B, and processor 1006C. As shown in FIG. 1 and in accordance with protocols known in the art, when an incoming call directed to a mobile subscriber in a CAMEL network is received, GMSC 1006 can fetch the terminating party's Terminating CAMEL Subscription Information (T-CSI) from that mobile subscriber's HLR 1001 by sending a Send Routing Information (SRI) message to HLR 1001 via Mobile Application Part (MAP) 1004. HLR 1001 can then send a Provide Subscriber Information (PSI) message by way of Mobile Application Part (MAP) protocol 1004 to MSC/VLR 1002 where the mobile terminating subscriber is registered to obtain presence information regarding the subscriber. In accordance with aspects herein, this information can include a local time for the MSC where the subscriber is registered. The information can be passed via MAP 1004 from MSC/VLR 1002 to HLR 1001 and then via MAP 1004 from HLR 1001 to GMSC 1006 and finally via CAP 1005 from GMSC to SCP 1003. SCP 1003 can use this information, for example, to determine an eligibility of a prepaid subscriber to receive an incoming call or to set a first charging rate to be applied to the call.

GMSC 1006 can also obtain information regarding the terminating mobile subscriber via ISUP interface 1008 from the MSC/VLR where the subscriber is registered. This information can include location and local time information regarding the terminating mobile subscriber such as an identity and local time of the MSC/VLR where the subscriber is registered or more specific location information such as an identity and local time location area code (LAC) that includes a range of cells or an identity and local time of a specific cell where the subscriber is registered as identified by a Cell Global ID (CGI) or otherwise. In accordance with one or more aspects herein, GMSC 1006 can obtain updated location information during the progress of the call by means of ISUP messages from MSC/VLR 1002. ISUP messages are known in the art, and are described in publications of the International Telecommunications Union such as ITU-T Recommendation Q.762, "Signalling System No. 7—ISDN User Part general functions of messages and signals," and ITU-T Recommendation Q.763, "Signalling System No. 7—ISDN User Part formats and codes," both of which are incorporated by reference herein in their entirety. ISUP messages that can provide updated location or local time information to GMSC 1006 can include a Call Progress Message (CPG), an Information Request Message (INR)/Information Message (INF), or a User-to-User Information Message (USR) known in the art. A Call Progress Message (CPG) can be used to report to GMSC 1006 that a significant event such as a change of LAC has occurred during the course of the call. An Information Request Message/Information Message pair also can be used by GMSC 1006 and MSC/VLR 1002 to request and obtain information relating to the call, such as the most recent location or local time information regarding the terminating subscriber. Alternatively, a User-to-User Information Message can be used by MSC/VLR 1002 to report subscriber location or local time information to GMSC 1006 without the need for an information request to trigger a message in response. Any of these of other similar messages can be used to communicate location or local time information from MSC/VLR 1002 to GMSC 1006 for use in determining an eligibility of a prepaid subscriber to continue the ongoing call or in setting a charging rate in accordance with aspects herein.

Alternatively, in a CAMEL Phase 3 system, when the MSC 1002 receives an incoming call set up request, it can check if the subscriber record in VLR 1002B includes VT-CSI which is part of CAMEL Phase 3 functionalities. If the subscriber's VLR record includes VT-CSI, the MSC/VLR 1002 can contact SCP 1003 using GSM Service Switching Function (gsmSSF) 1002E by way of CAMEL Application Part (CAP) protocol 1005, to inform SCP 1003 that the caller is a CAMEL subscriber and that the call should be processed by Service Control Function gsmSCF 1003A.

Among the functions performed by SCP 1003 is managing and calculating charges incurred by a prepaid subscriber for outgoing and incoming calls. SCP 1003 can obtain information regarding a prepaid mobile subscriber from Prepaid Platform 1010. According to aspects herein, memory 1010A in Prepaid Platform 1010 can contain information regarding a prepaid mobile subscriber's prepaid account, for example, account balance, call charging history, and special rate information, if any. Processor 1010B and Rating Engine 1010C in Prepaid Platform 1010 can calculate a prepaid subscriber's account balance and available funds, determine whether a prepaid subscriber has sufficient funds or is otherwise eligible to complete an outgoing or incoming call, and communicate this information to SCP 1003 for use in controlling the prepaid call. In accordance with aspects herein, a subscriber's eligibility can depend on the rate to be charged for the prepaid call. For example, a call that is charged at a peak rate may be more expensive than a call charged at an off-peak rate, and while a subscriber may have sufficient funds in her prepaid account to cover a call that is charged at an off-peak rate, she might not have sufficient funds to cover a call that is charged at a peak billing rate. Alternatively, there may be times when calls are charged at a special rate or may be free, such as at a time of a special event or a natural disaster, and thus a prepaid subscriber may be eligible to complete a call at that time irrespective of her prepaid account balance.

FIG. 1 also depicts Specialized Resource Function gsmSRF 1007, which may contain an Announcement Terminal 1007A, as an element of a CAMEL network. The SCP 1003 can instruct the MSC/VLR or GMSC via CAMEL Operation: Establish Temporary Connection to set up a speech path to gsmSRF 1007. The gsmSRF, in turn, can contact SCP 1003 via CAP 1005 and can receive messages from SCP 1003 via CAP 1005 which can enable gsmSRF 1007 to play one or more messages to a caller by means of Announcement Terminal 1007A. For example, if processor 1010B in Prepaid Platform 1010 determines that a subscriber's prepaid account balance has fallen below a predetermined limit, Prepaid Platform 1010 can instruct SCP 1003 to cause Announcement Device 1007A to play a message informing the caller that the balance in the subscriber's prepaid account is insufficient to permit the call to be completed.

As noted above, a mobile subscriber can receive specialized services from her mobile service provider based on information regarding the subscriber at a particular time or regarding a time associated with the subscriber. For example, a subscriber can receive different services depending on whether she is in a particular location at a particular time, and thus it can be important to obtain current information regarding the subscriber at that time.

One common time-based service is the provision of a different charging schedule for the call depending on the time. Such time-based charging, often embodied in peak/off-peak pricing wherein a call made or received at a "peak" time is charged at a higher rate than one at an "off-peak" time, can require that the Prepaid Platform have accurate information regarding a time associated with the mobile subscriber, such as the local time of the subscriber or a difference between the subscriber's local time and a standard time such as Greenwich mean time.

Conventional CAMEL systems provide means of enabling the SCP to learn the local time for a prepaid subscriber so that peak and off-peak charging can be made for the call. For example, in a Mobile Originating call, the CAMEL Operation: Initial DP (Operation: IDP) message from the MSC to the SCP can contain the local time and time zone information of the CAMEL VLR where the subscriber is registered, and thus accurate peak or off-peak charging for an outgoing call can easily be made.

For Mobile Terminating calls made according to conventional methods, providing local time information to enable accurate peak or off-peak charging is more complicated.

In CAMEL Phase 2 systems, the GMSC that maintains the CAP Dialogue with the SCP can send the local time of the GMSC at call setup via the Operation: IDP. However, this may not be the local time of the Visited MSC where the subscriber is registered at the time of the incoming call and so would not provide accurate charging for the call. In order to obtain a local time for the mobile subscriber, in conventional CAMEL Phase 2 systems, the Prepaid Platform can maintain a table with each VLR's time zone. In this way, when the SCP receives information regarding the Visited MSC/VLR where the subscriber is registered in the Operation: IDP, it can derive the local time for that MSC and charge the terminating subscriber for the call according to the correct time. If the Visited MSC covers a geographic area that lies in two time zones, the SCP can maintain the time zone information with respect to different locations by means of listing the time zone for each cell as identified by a Cell Global ID or group of cells identified by a Location Area Code (LAC).

In a conventional CAMEL Phase 3 network, control of a Mobile Terminating call can be handled from the Visited MSC rather than the GMSC. In such a case, the Visited MSC can report its local time during call set up in the Operation: IDP, and thus enable the SCP and the Prepaid Platform to properly charge subscriber for the terminating call based on the correct local time.

FIGS. 2A-2C and 3A-3C depict a call processing flow for obtaining a mobile terminating subscriber's local time information in a conventional CAMEL Phase 2 and Phase 3 network, respectively.

Figure 2A:
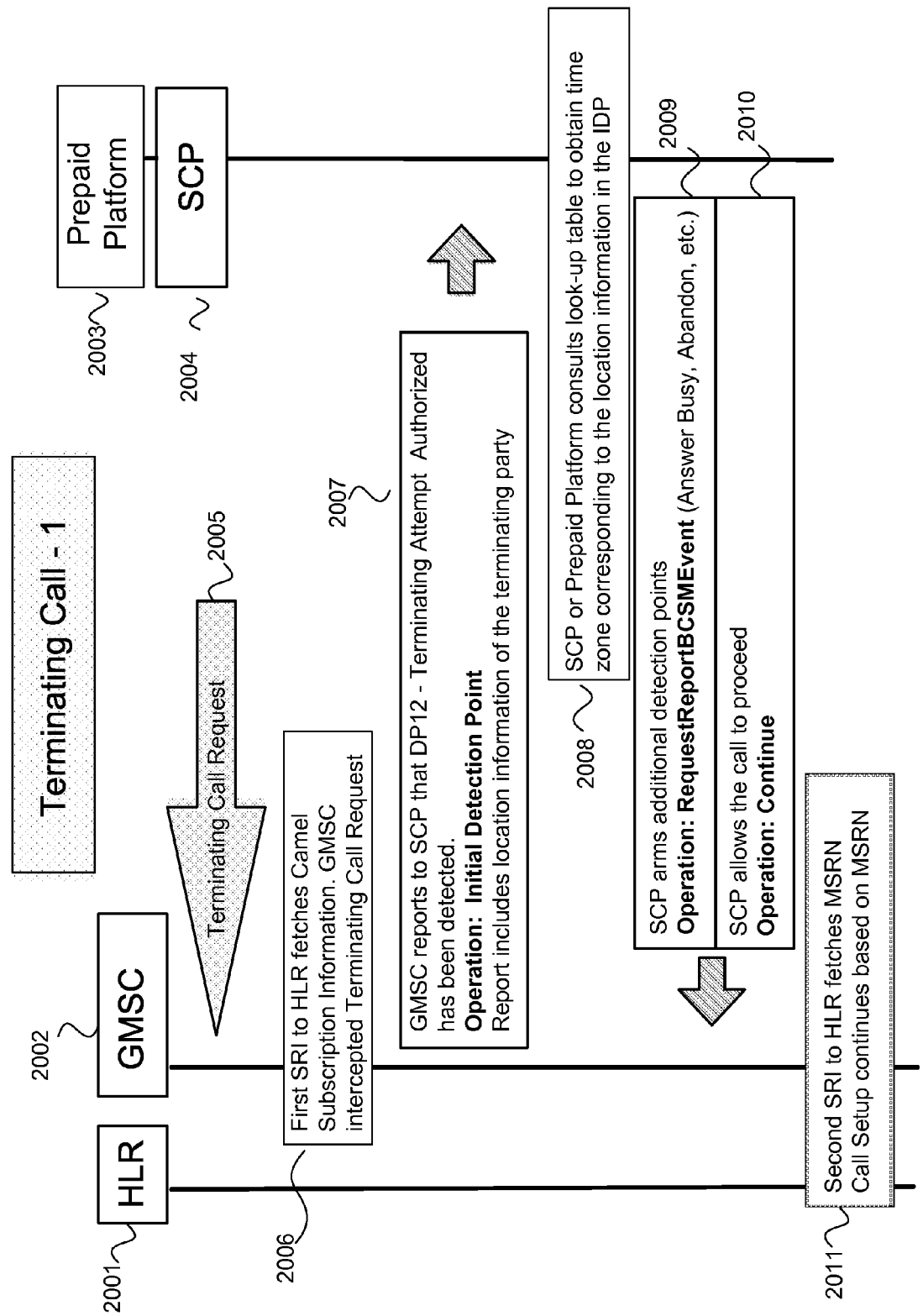
FIGS. 2A-2C depict a call flow for providing time information in a CAMEL Phase 2 Terminating Basic Call State Model in a mobile network in accordance with conventional methods.

As seen in FIG. 2A, a call processing flow for a Mobile Terminating call in a conventional CAMEL Phase 2 network is processed by messages sent between HLR 2001, GMSC 2002, Prepaid Platform 2003, and SCP 2004. Call processing begins when a Terminating Call Request 2005 is directed to GMSC 2002. At step 2006, GMSC 2002 uses a Send Routing Information (SRI request) message to the mobile subscriber's HLR to obtain information necessary to set up the incoming call, such as the subscriber's Terminating CAMEL Subscription Information (T-CSI) which contains information such as information identifying the subscriber, the subscriber's service key identifying the CAMEL services available to the subscriber, the trigger detection points for a terminating call for the subscriber, and the subscriber's default call handling parameters. The HLR also will provide current status information regarding the subscriber such as her location and the MSC/VLR where she is registered. Once GMSC detects the presence of T-CSI, it intercepts further call processing in order to contact the SCP.

At step 2007, GMSC 3002 reports to SCP 2004 via an Operation: Initial Detection Point (Operation: IDP) that a Terminating Call Request has been received by GMSC 2002. The information contained in the IDP includes her current location information, which includes one or more of the following: the address of the VLR where she is located, the Cell Global Identity (CGI) of the cell where she is registered, or the Location Area Code (LAC) of a group of cells including the cell where she is registered.

At step 2008, in a conventional CAMEL Phase 2 system, SCP 2004 uses a database of location information that correlates location information to the local time at that location to derive the mobile subscriber's local time. The SCP can use the subscriber's location and local time information to calculate the rate for this call, for example, as a peak or off-peak call based on the subscriber's local time. The SCP also establishes that the prepaid subscriber is eligible to receive the incoming call, for example, because her prepaid account balance is high enough to cover charges for the call or she is otherwise eligible to receive a call, for example, because she is in a special location or the call is subject to a special promotion. Once it is determined that the call can proceed, at step 2009, SCP 2003 arms one or more Event Detection Points in the call (for example, detection points relating to Answer, or Busy, status of the call) via the Operation: RequestReportBCSMEvent sent to the GMSC 2002. In addition, at step 2010, SCP 3003 permits the call to proceed by sending the Operation: Continue to GMSC 2002. At step 2011, GMSC 2002 sends a second SRI request to the HLR to obtain a temporary routable number known as Mobile Station Routing Number (MSRN) so that GMSC 2002 can route the call to the recipient.

Figure 2B:
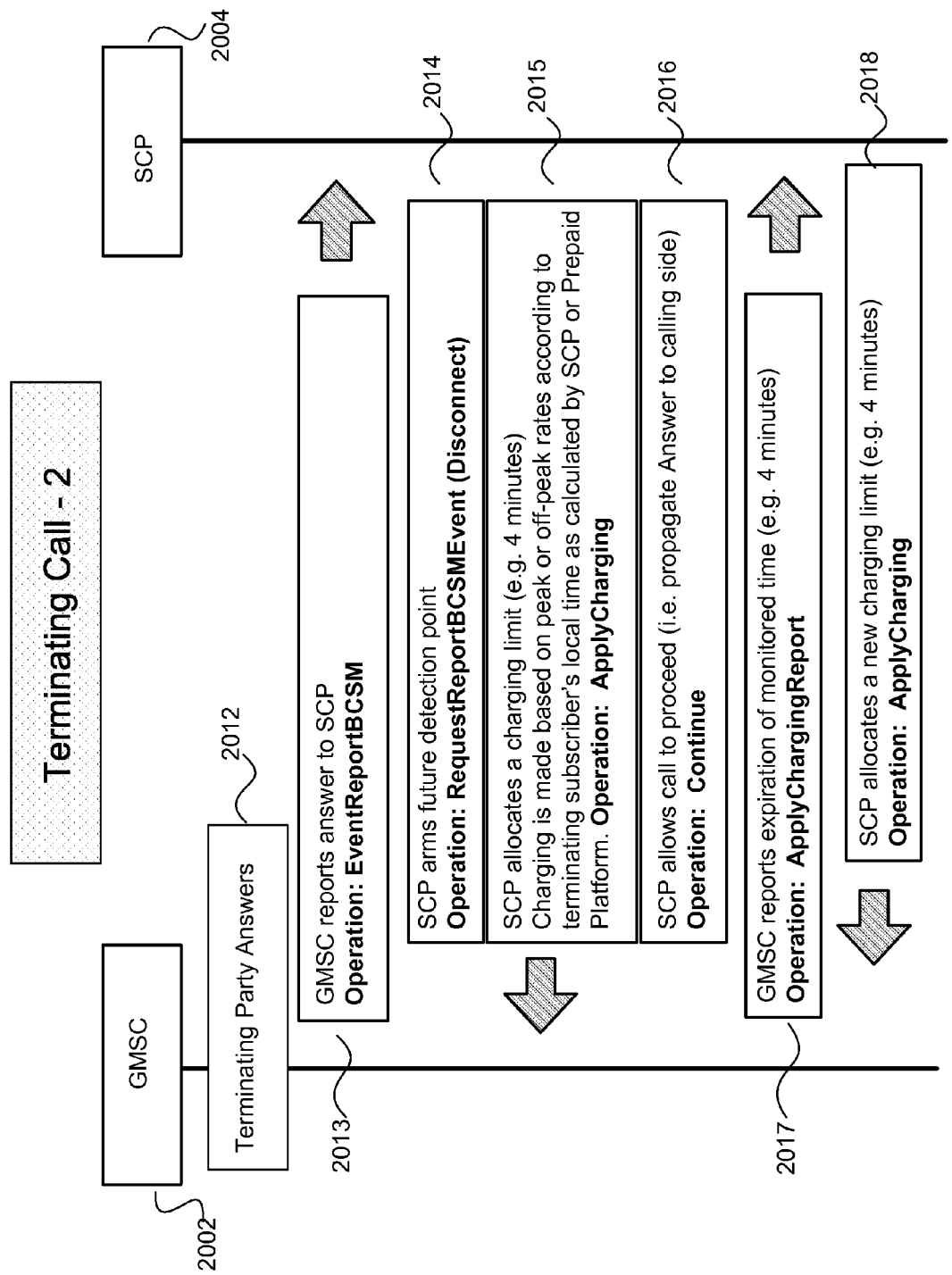
Figure 2C:
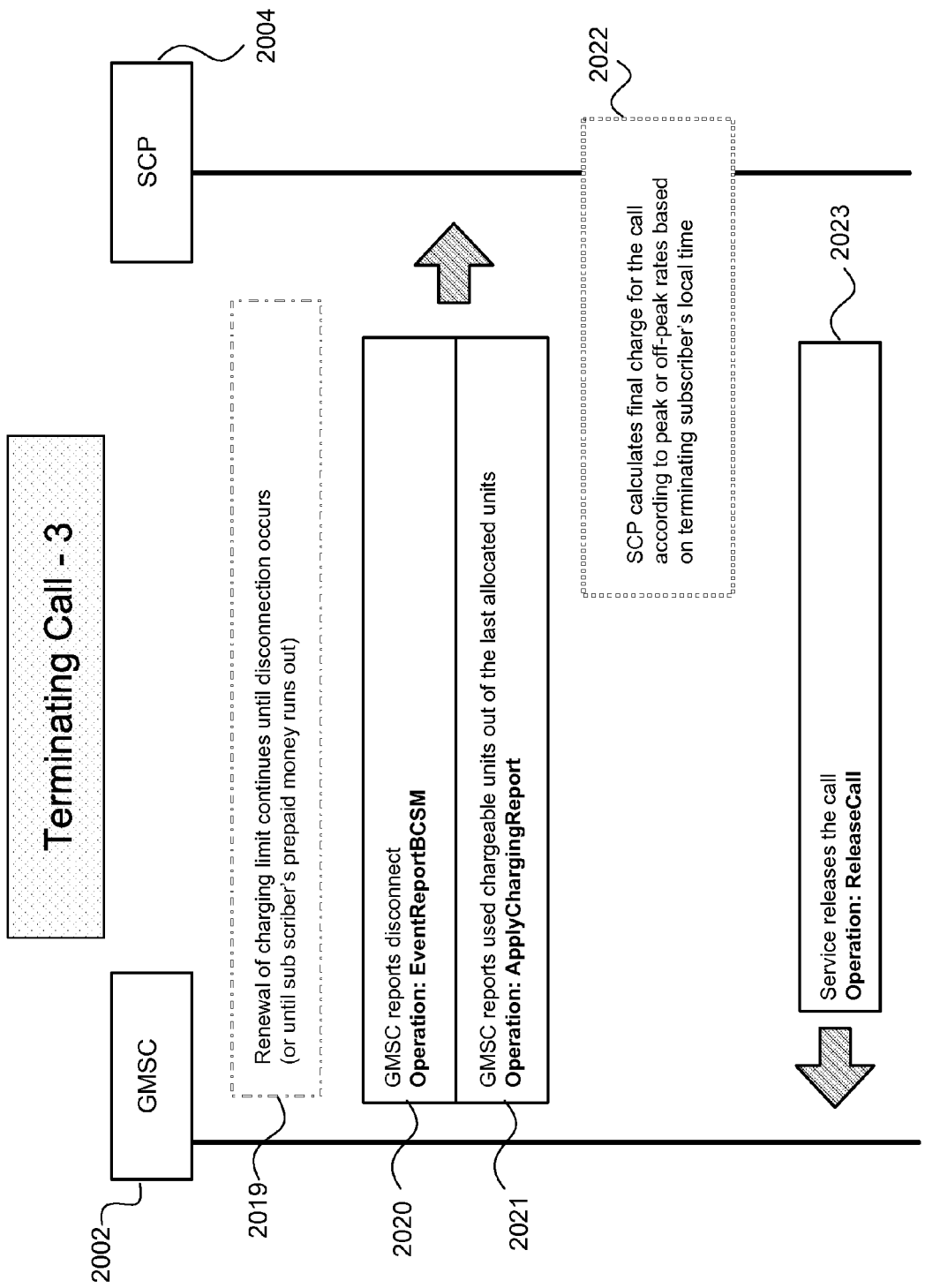

In FIGS. 2B and 2C additional call processing steps in a conventional CAMEL phase 2 call are shown. At step 2012, the Terminating Party answers the call, and at step 2013, GMSC 2002 reports that the call has been answered to SCP 2004 via Operation: EventReportBCSM. At step 2014, SCP 2004 arms future DPs for further call processing and advises GMSC 2002 of the arming of the DPs. For example, an EDP for disconnection of the call can be armed and the arming of this EDP can be reported to GMSC 2002 via Operation: RequestReportBCSMEvent.

In addition, to ensure that the prepaid subscriber does not exceed her prepaid account balance or otherwise become ineligible to continue the call, messaging between GMSC 2002 and SCP 2004 control call flow in segments so that the prepaid subscriber's eligibility to continue the call can be monitored. For example, at step 2015, SCP 2004 allocates a charging limit time period, for example, 4 minutes, to the prepaid call and via Operation: ApplyCharging advises GMSC 2002 of this charging limit time period instructs GMSC 2002 to monitor for its expiration. In a call processed according to conventional CAMEL phase 2 processing, the charging for each time period is based on peak or off-peak rates according to the terminating subscriber's local time as calculated by the SCP or Prepaid Platform through use of the VLR time zone look-up table described with reference to step 2008. After setting the initial call charging period, at step 2016, SCP 2004 allows the call to proceed by instructing GMSC 2002 via Operation: Continue to propagate the answer to the calling party side.

After the expiration of the initial charging limit time period, e.g., after the expiration of 4 minutes, at step 2017, GMSC 2002 reports to SCP 2004 via Operation: ApplyChargingReport that the monitored time has expired. If the caller's prepaid account balance is sufficiently high to cover an additional period or the prepaid subscriber is otherwise eligible to continue the call, at step 2018, SCP 2004 allocates a new charging limit, again, for example, 4 minutes, and via a second iteration of Operation: ApplyCharging advises GMSC 2002 of this new charging limit period.

As seen in FIG. 2C, in step 2019, according to conventional CAMEL Phase 2 methods, the allocation, monitoring, and renewal of charging limits seen in steps 2015, 2017, and 2018 of FIG. 2B continues until the call is disconnected, for example, by the parties ending the call, or until the prepaid terminating party's prepaid money runs out. Upon the occurrence of any of these events, at step 2020, GMSC 2002 reports disconnection of the call to SCP 2004 via Operation: EventReportBCSM. At step 2021, GMSC 2002 reports the chargeable time units used out of the last time units allocated for the call so that the terminating parties prepaid account can be charged for the call. At step 2022, SCP 2004 calculates the final charge for the call, and the total charge will be deducted from the subscriber's prepaid account balance. In a conventional CAMEL call, both the initial allocated time period and all subsequent time periods are charged at the same peak or off-peak rate based on the terminating subscriber's local time determined using the VLR time zone look-up table in step 2008. Finally, at step 2023, via Operation: ReleaseCall SCP 2004 instructs the GMSC 2002 to release the call and the call ends.

Figure 3A:
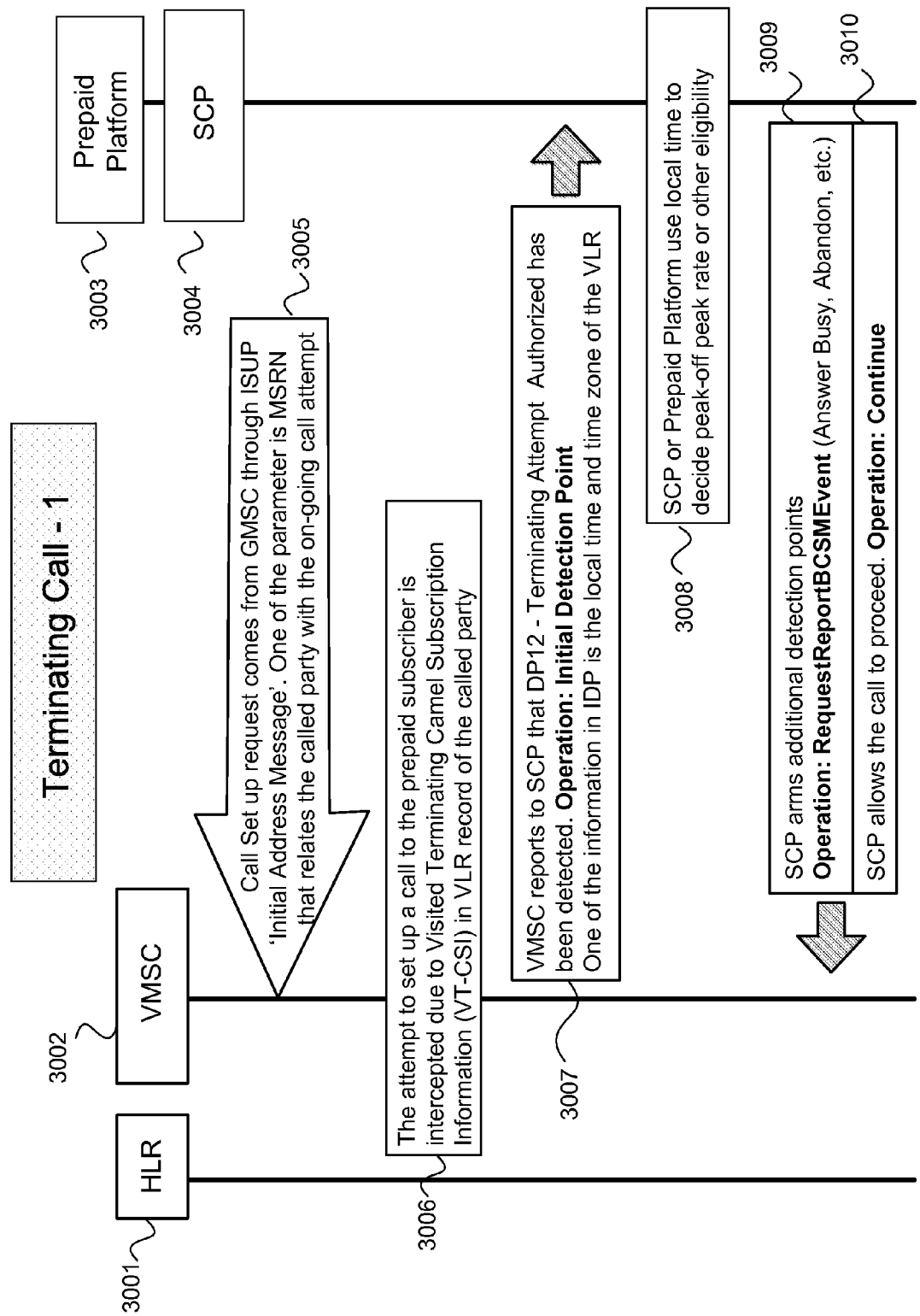
FIGS. 3A-3C depict an alternative call flow for providing time information in a CAMEL Phase 3 Terminating Basic Call State Model in accordance with conventional methods.
Figure 3B:
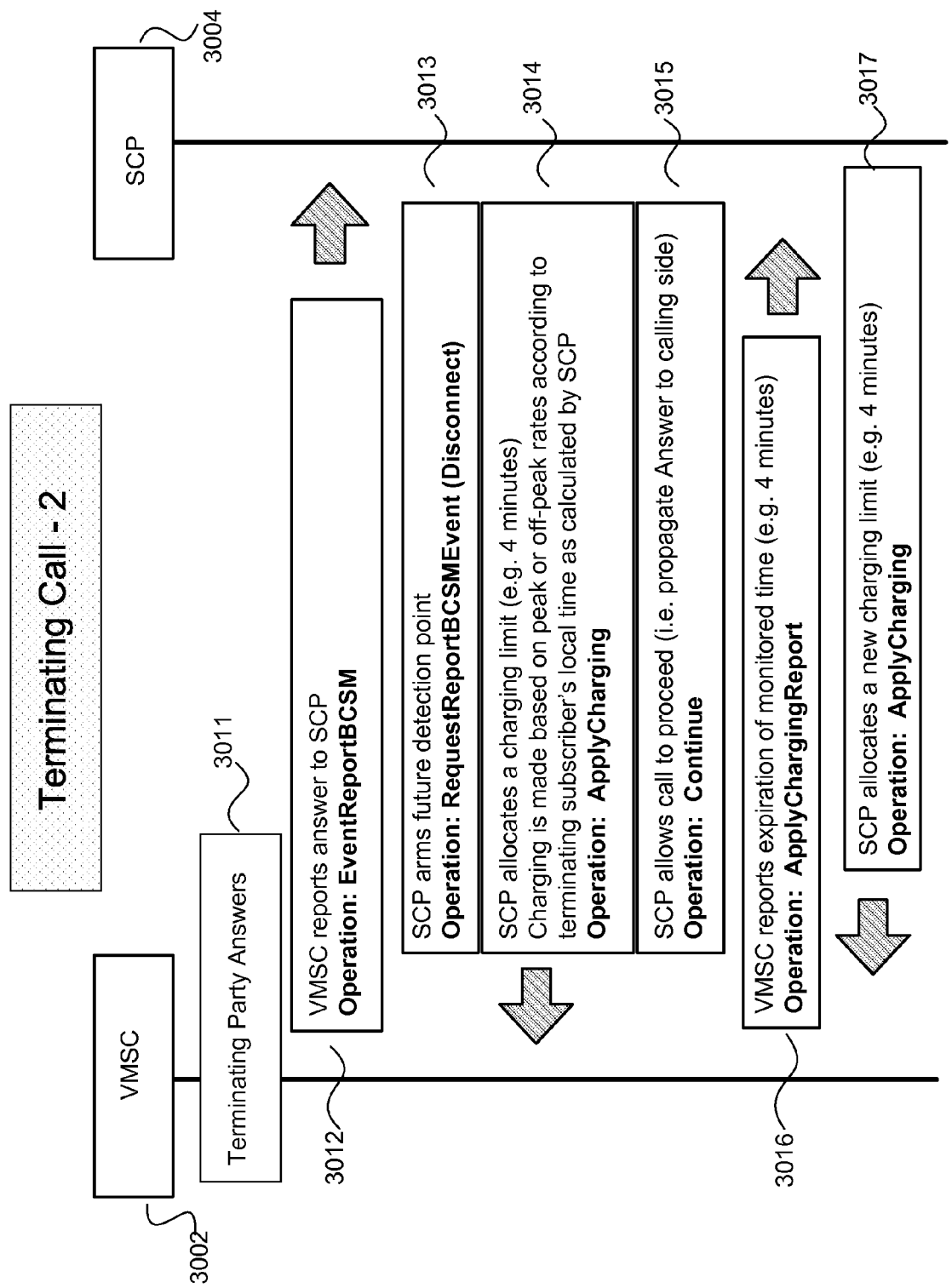
Figure 3C:
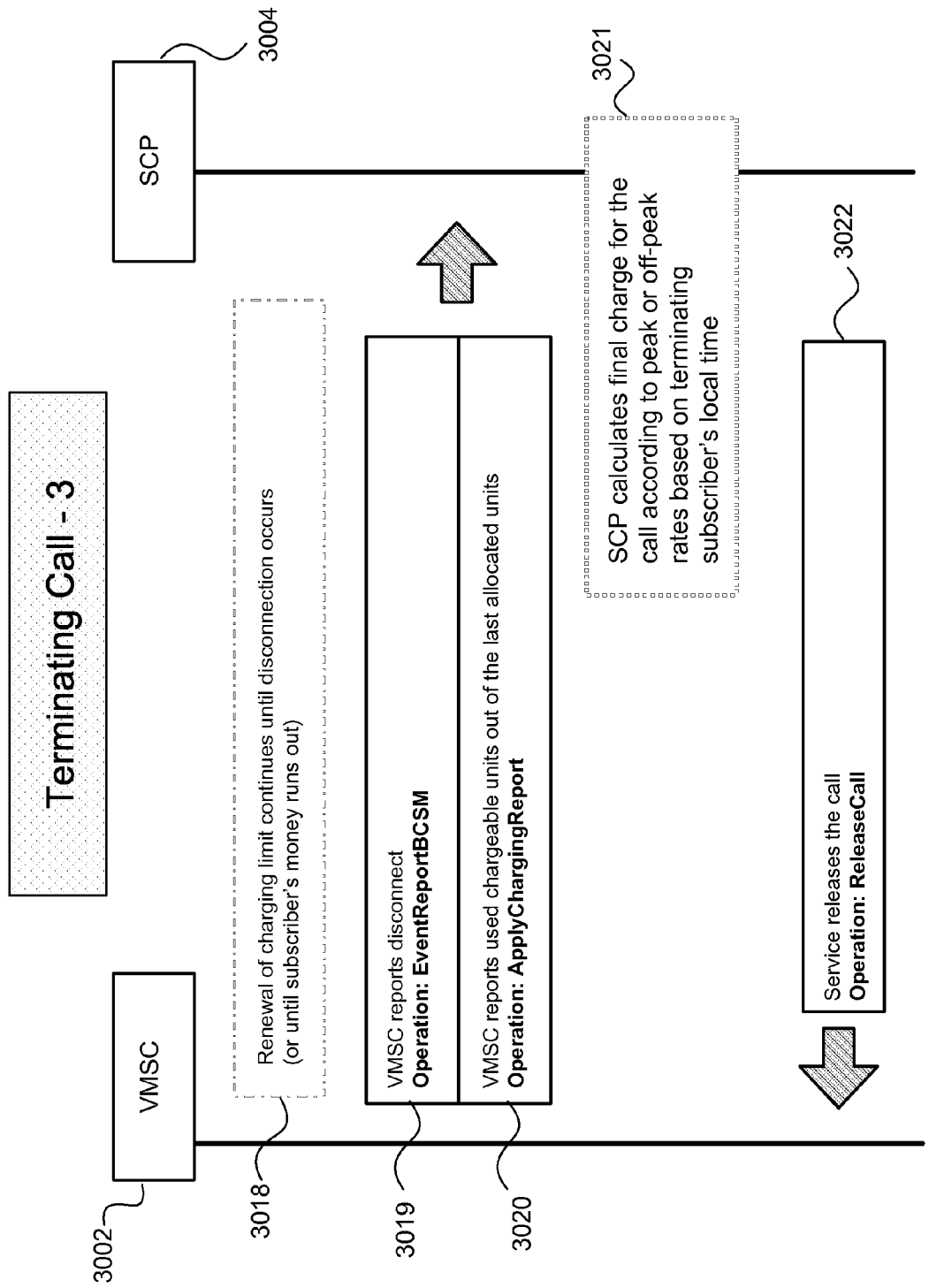

FIGS. 3A-3C depict a call processing flow for obtaining a terminating mobile subscriber's local time according to conventional methods in a telecommunications network using CAMEL Phase 3. In contrast to a CAMEL Phase 2 terminating call, a CAMEL Phase 3 terminating call can be handled by the Visiting Mobile Switching Center (VMSC) 3002 where the mobile subscriber is registered, in conjunction with the HLR 3001, Prepaid Platform 3003, and SCP 3004.

As seen in FIG. 3A, at step 3005, a Call Setup request in a conventional CAMEL Phase 3 network is received by VMSC 3002 from the GMSC (not shown) via an ISUP "Initial Address" message. One of the parameters in this message is the Mobile Station Routing Number (MSRN) used to route the call to the called prepaid mobile subscriber in the VMSC where she is located. At step 3006, the terminating call request to the prepaid mobile subscriber is intercepted because the VLR record of the called party contains Visited Terminating CAMEL Subscription Information (VT-CSI), which instructs the VMSC to process the call according to CAMEL Phase 3 protocols.

The first step in processing the call according to CAMEL Phase 3 is to contact the SCP, and thus at step 3007, VMSC reports to SCP 2004 via CAMEL Operation: Initial Detection Point that DP12-Terminating Attempt Authorized has been detected. In accordance with conventional CAMEL Phase 3 call processing, this message from VMSC 3002 to SCP 3004 contains information regarding the local time and time zone of the VLR where the mobile subscriber is registered. At step 3008, SCP 3004 and Prepaid Platform use this local time information to set a charging rate for the call, for example a peak or an off-peak rate, and determines whether the prepaid subscriber is eligible to receive the terminating call. At step 3009, once the subscriber has been determined to be eligible to receive the call, via Operation: RequestReportBCSMEvent SCP 3004 arms additional detection points relating to the call at that point, for example, to detect events such as call answer, subscriber not reachable, call abandoned, and instructs VMSC 3002 to monitor for such events. At step 3010, via Operation: Continue SCP 3004 allows the call to proceed.

FIGS. 3B-3C depict additional steps for processing a terminating call to a mobile subscriber by the VMSC in a CAMEL Phase 3 network. The additional processing starts at step 3011, when the terminating mobile subscriber answers the call, and at step 3012 VMSC 3002 reports the answer event to SCP 3004. Following receipt of the message that the call has been answered, at step 3013, SCP 2004 arms a future detection point relating to disconnection of the call via Operation: RequestReportBCSMEvent (Disconnect).

In addition, as with a call processed according to conventional CAMEL Phase 2 methods, messaging between VMSC 3002 and SCP 3004 control call flow in segments so that the prepaid subscriber's eligibility to continue the call can be monitored. At step 3014, SCP 3004 allocates a charging time period limit, for example, 4 minutes, to the prepaid call, advises VMSC 3002 of this charging limit via Operation: ApplyCharging, and instructs VMSC 3002 to monitor for the expiration of this time period. At step 3015, via Operation: Continue SCP 3004 instructs VMSC 3002 to allow the call to proceed. After the expiration of the allocated charging limit time, at step 3016, VMSC 3002 reports to SCP 3004 via Operation: ApplyChargingReport that the monitored time has expired. If the caller's prepaid account balance is sufficiently high to cover an additional period or the prepaid caller is otherwise eligible to continue the call, at step 3017, SCP 3004 allocates a new charging limit time period to the call, for example, another 4 minutes, via a second iteration of Operation: ApplyCharging, and instructs VMSC 3002 to monitor for the expiration of this additional time period. Charging for the call, and thus the subscriber's eligibility, is based on the peak/off-peak rates set by SCP 3004 and Prepaid Platform 3003 according to the terminating subscriber's local time as reported in Operation: Initial Detection Point.

As seen in FIG. 3C, at step 3018 the allocation, monitoring, and renewal of charging limits seen in steps 3014, 3016, and 3017 continues until the parties disconnect the call or the prepaid subscriber is no longer eligible to make the call, for example, because the SCP determines that her prepaid balance is too low to permit the call to continue.

Upon the occurrence of either of these events, the call is disconnected and at step 3019 VMSC 3002 reports disconnection of the call to SCP 3004 via Operation: EventReportBCSM (Disconnect). At step 3020 VMSC 3002 reports the chargeable time units used out of the last time units allocated for the call to SCP 3004 via Operation: ApplyChargingReport. At step 3021, SCP 3004, in conjunction with Prepaid Platform 3003, calculates the final charge for the call based on the peak or off-peak rate determined by the subscriber's local time at call set-up. The charge for the call as so calculated is then deducted from the subscriber's prepaid account balance, and at step 3022, SCP 3004 instructs VMSC 3002 to release the call via Operation: ReleaseCall and call processing stops.

A drawback of this approach to providing local time information is that CAMEL phase 3 is required for all roaming partners participating in the call.

In one embodiment according to one or more aspects described in more detail below, there is provided a method and system for efficiently providing a terminating mobile subscriber's local time information to the SCP and/or Prepaid Platform so that time-based charging, such as peak/off-peak charging, can be applied to the call.

In accordance with aspects herein, local time information such as a local time or a time zone of a terminating mobile subscriber's location can be provided as part of the information provided to the GMSC from the MSC where the subscriber is located at the time of call set-up. This information can then be provided to the SCP/Prepaid Platform and can be used to apply peak or off-peak charging rates to the call according to the time information, such as the local time of the subscriber's location at the time she receives the call.

In addition, in accordance with other aspects, the subscriber's location and local time information can be reported to the SCP as an additional reporting parameter each time the GMSC reports to the SCP that the time monitored pursuant to Operation: OperationApplyCharging has expired. By receiving updated information regarding the location and local time of the mobile subscriber at each segment, the SCP can set a charging rate for the next allocated segment as based on a peak, off-peak, or other special rate based on recent information regarding the time in the location where the mobile subscriber is during that segment.

In the case of a mobile terminating call, in accordance with one or more aspects described herein, updated local time information can be fetched from the VLR where the mobile subscriber is registered by means of ISUP messages between the VLR and the GMSC. This updated time information can then be included in the Operation: ApplyChargingReport from the GMSC to the SCP that is sent at the end of each call segment.

FIGS. 4A-4F depict an exemplary call processing flow for a terminating call to a prepaid mobile subscriber in a system in which local time information for the terminating subscriber can be provided both at call setup and during the call. As shown in FIGS. 4A-4F, a terminating call in accordance with aspects herein can be processed by messages between a Home Location Register (HLR) 4001, a Gateway Mobile Switching Center (GMSC) 4002, a Mobile Switching Center (MSC)/Visiting Location Register (VLR) 4003 where the subscriber is registered, a Service Control Point (SCP) 4004, and a Prepaid Platform 4005.

In particular, according to aspects described herein, the call processing flow depicted in FIGS. 4A-4F includes steps for obtaining a local time and time zone for a terminating mobile subscriber so that the call can be charged based on peak or off-peak rates according to the terminating subscriber's local time at the time of the call. It should be noted that the procedures for obtaining a local time in accordance with aspects herein can be used in systems utilizing either CAMEL Phase 2 or later CAMEL Phases such as CAMEL Phase 3, CAMEL Phase 4 or any modifications beyond those Phases and are not limited to a particular version of CAMEL, but can be used in any telecommunications network utilizing CAMEL protocols for the provision of prepaid services to a subscriber.

Figure 4A:
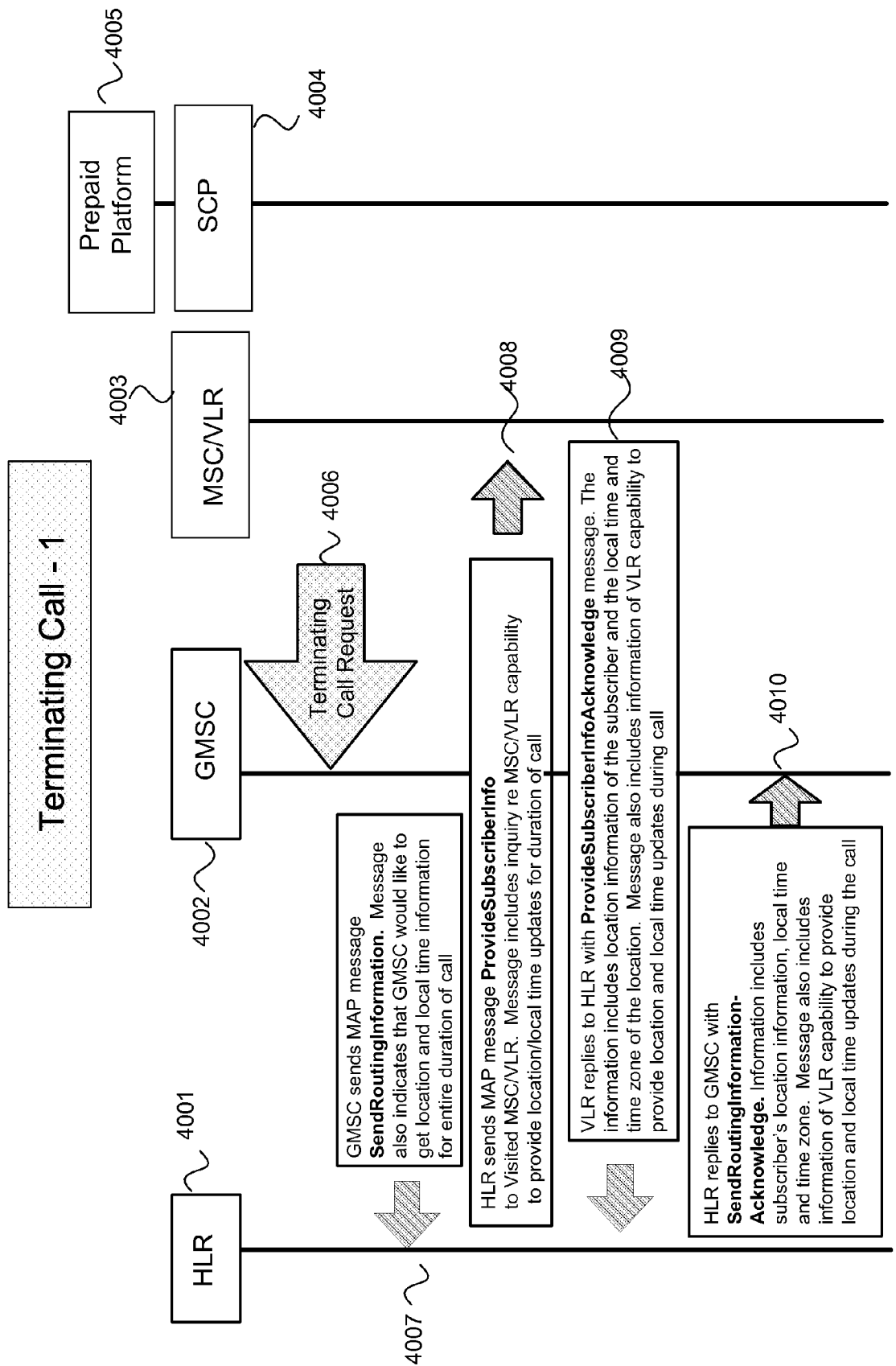
FIGS. 4A-4F depict one embodiment of a call flow in a CAMEL Terminating Basic Call State Model in accordance with one or more aspects described herein.

As seen in FIG. 4A, a terminating call to a prepaid mobile subscriber can be processed by messages sent between a HLR 4001, GMSC 4002, MSC/VLR 4003, SCP 4004, and Prepaid Platform 4005. At step 4006, a Terminating Call Request to a prepaid mobile subscriber in a CAMEL network can be directed to GMSC 4002. At step 4007, upon receipt of the Terminating Call Request GMSC 4002 can send a MAP message SendRoutingInformation (SRI) to HLR 4001 to obtain information necessary to set up the incoming call. This information can include the call recipient's terminating CAMEL Subscription Information (T-CSI) or other information such as a caller's eligibility to complete a call.

At step 4008 HLR 4001 can send a ProvideSubscriberInformation (PSI) request to the MSC/VLR 4003 where the subscriber is registered to obtain additional information regarding the subscriber such as subscriber location and subscriber state (e.g., idle, busy, not available). At step 4009 MSC/VLR 4003 can respond by means of a ProvideSubscriberInfoAcknowledge (PSI Acknowledge) message to HLR 4001, and as part of this message VLR 4003 can provide information to HLR 4001 regarding the current location and local time information of the mobile subscriber. The location information can include information such as an identity of the MSC where the subscriber is registered, a Cell Global ID (CGI) of the cell where the subscriber is located or a Location Area Code (LAC) describing a group of cells within a larger area. The local time information can include, for example, one or more of a local time at the subscriber's current location, a local time zone such as the Eastern Standard Time Zone in the United States, or a difference between the subscriber's local time and a reference time such as Greenwich Mean Time. At step 4010, HLR 4001 can provide the subscriber's location and local time information received from the VLR to GMSC 4002 by means of a SendRoutingInformationAcknowledge (SRI Acknowledge) message.

During this messaging between GMSC 4002, HLR 4001, and VLR 4003, in an embodiment in accordance with one or more aspects described herein, GMSC 4002 can indicate to the HLR and/or the VLR that it would like to get dynamic updates of the current location and local time information of the subscriber for the whole duration of the call. For example, at step 4007 when GMSC 4002 sends an initial SRI message to HLR 4001 in the call, GMSC 4002 can include one or more flags to indicate that it would like to get location and local time updates from the VLR during the call. HLR 4001 can pass those flags to VLR 4003 in a PSI message sent at step 4008, and at step 4009 VLR 4003 can advise of its capability to provide dynamic updates of location and time information in a PSI Acknowledge message back to HLR 4001. HLR 4001 can then pass those flags to GMSC 5003 in an SRI Acknowledge message, for example, the SRI Acknowledge message sent at step 4010.

Figure 4B:
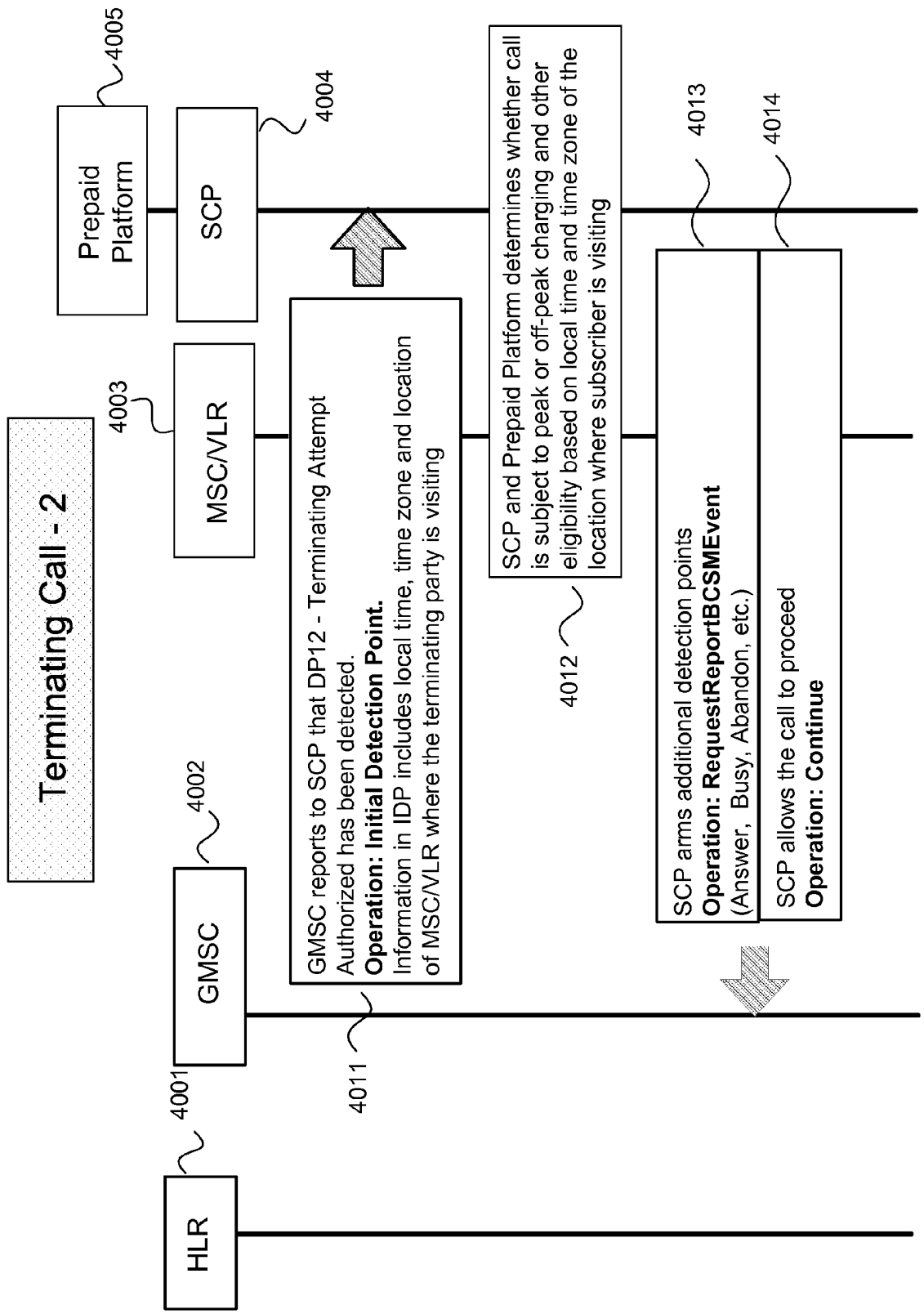

At step 4011 seen in FIG. 4B, via Operation: InitialDetectionPoint, GMSC 4002 can report to SCP 4004 that an initial detection point for the call, for example, DP12-Terminating Attempt Authorized, has been detected. This message from GMSC 4002 to SCP 4004 can also include additional information regarding the prepaid subscriber, such as the prepaid subscriber's location and local time. This message also can include information regarding the capabilities of GMSC 4002, for example, whether GMSC 4002 can supply SCP 4004 with the terminating mobile subscriber's updated local time information after the call is set up.

Using the information in the IntitialDetectionPoint message from GMSC 4002, at step 4012 SCP 4004 and Prepaid Platform 4005 can determine an initial charging rate to be applied to the call, for example, a peak rate or an off-peak rate based on the terminating mobile subscriber's local time or time zone. In addition, Prepaid Platform 4005 and SCP 4004 can use the terminating subscriber's time information to determine the subscriber's eligibility to receive the call, based on the subscriber's prepaid account balance or otherwise. For example, the terminating prepaid subscriber may have sufficient funds in her account to cover a terminating call that is charged at an off-peak rate but not enough to cover a call charged at a peak rate, and so would not be eligible to receive calls until she adds more funds to her prepaid account. Alternatively, the mobile terminating subscriber may be eligible to receive calls at certain times irrespective of the adequacy of her account balance, such as at a time when the mobile service is running a special promotion or at a time of an emergency or natural disaster.

Once the initial charging rate for the terminating call has been set and the eligibility of the terminating mobile subscriber to receive the call has been determined as described above, SCP 4004 can arm one or more additional Event Detection Points to detect a next event in the call, such as Answer, Busy, or Abandon, and at step 4013 can instruct GMSC 4002 to monitor for such events via Operation: RequestReportBCSMEvent and at step 4014 can allow the call to proceed via Operation: Continue.

Figure 4C:
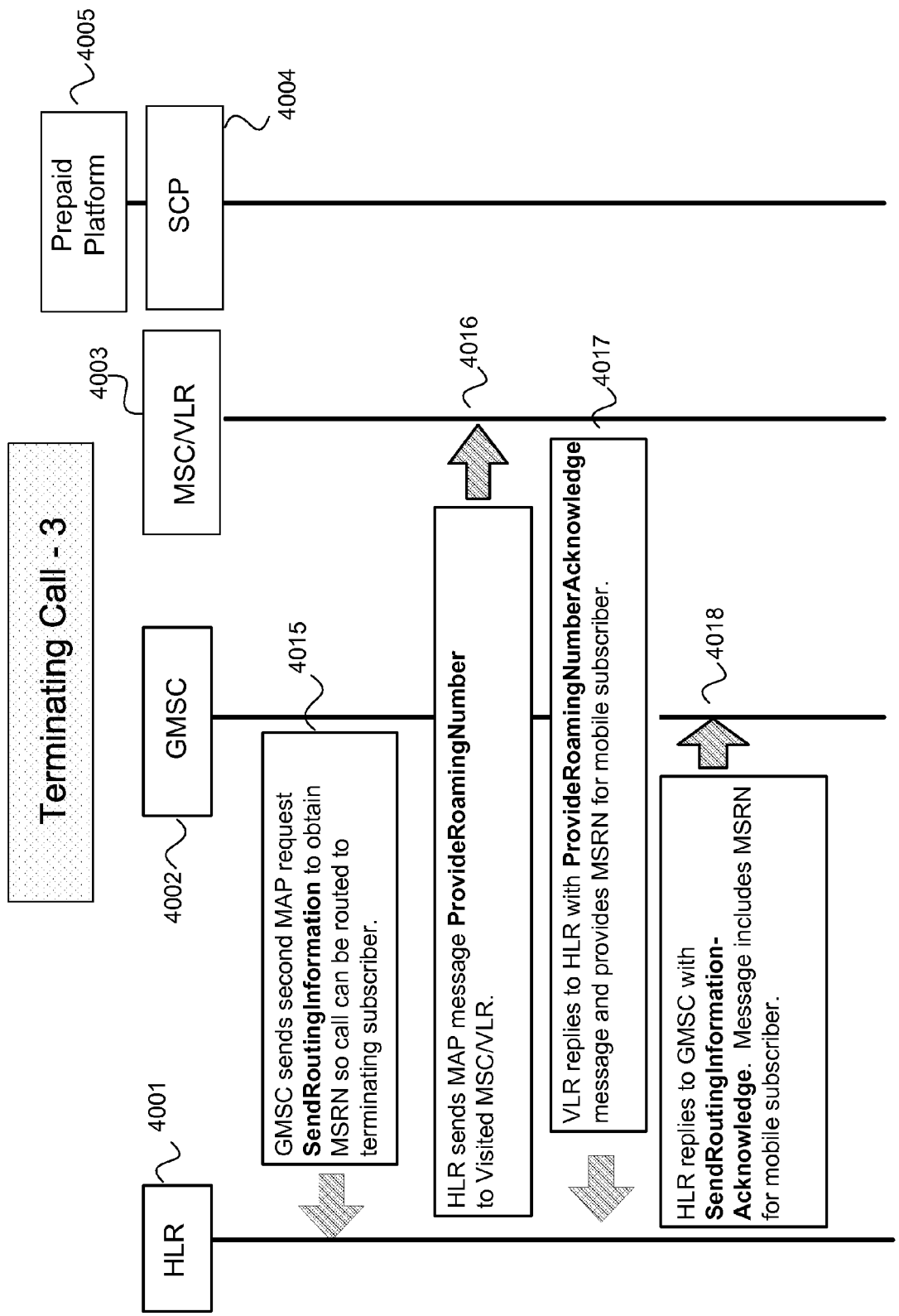

Additional exemplary call processing steps are shown in FIGS. 4C-4F. FIG. 4C depicts additional steps for setting up a call to a mobile subscriber as a terminating party to the call. As seen in FIG. 4C, at step 4015, GMSC 4002 can send a second SendRoutingInformation message to HLR 4001, for example, to obtain a Mobile Station Routing Number (MSRN) so that GMSC 4002 can route the call to the terminating subscriber. As seen in FIG. 4C, at this message, GMSC 4002 can also advise HLR 4001 that it is not interested in fetching the subscriber's T-CSI at this time, but only wants to receive an MSRN and related information. At step 4016, HLR 4001 can send a MAP message ProvideRoamingNumber to VLR 4003 to fetch the MSRN, and VLR 4003 can provide the MSRN at step 4017 in a ProvideRoamingNumberAcknowledge message to HLR 4001. HLR 4001 in turn can provide this MSRN to GMSC 4002 in a second SendRoutingInformationAcknowledge message sent at step 4018 so that the call can be routed to the MSC where the terminating mobile subscriber currently is registered.

Figure 4D:
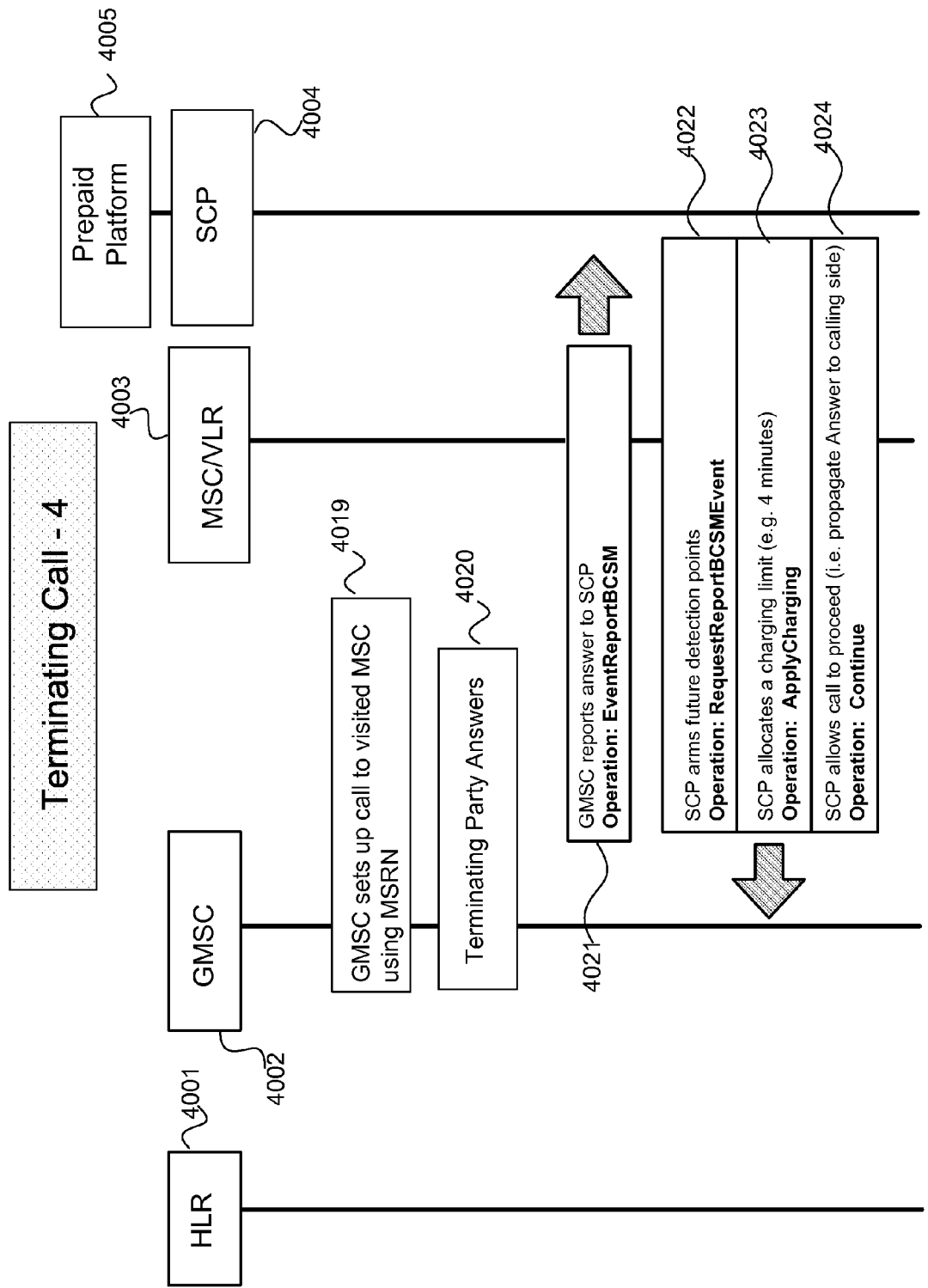

FIG. 4D depicts additional exemplary steps for processing a terminating call where local time information for a terminating subscriber has been provided. At step 4019, using the MSRN fetched from the subscriber's visiting MSC, GMSC 4002 can set up the terminating call and route it to the mobile subscriber. Once the call is routed, at step 4020, the mobile subscriber as a terminating party answers the call, and at step 4021, GMSC 4002 can report that answer event to SCP 4004 by way of CAP Operation: EventReportBCSM. At step 4022, SCP 4004 can arm future DPs to provide instruction for further processing of the call and can advise GMSC 4002 of those DPs via Operation: RequestReportBCSMEvent. For example, as seen in step 4022, SCP 4004 can arm a future DP for call disconnect via an Operation: RequestReportBCS-MEvent (Disconnect) and can advise GMSC 4002 of that DP so that when Disconnect occurs, GMSC 4002 can report that occurrence to SPC 4004.

Messaging between SCP 4004 and GMSC 4002 also can provide call duration, charging, and monitoring control to ensure that charges for a call received by the prepaid mobile subscriber as terminating party do not exceed the subscriber's prepaid account balance and to ensure that the subscriber is charged an accurate rate based on, for example, the local time or time zone of the subscriber's location. As part of this charging and monitoring control, at step 4023, SCP 4004 can allocate a first charging time limit to the prepaid call, for example, 4 minutes. SCP 4004 can advise GMSC 4002 of this charging limit and instruct GMSC 4002 to monitor for the expiration of this time period via Operation: ApplyCharging and via Operation: Continue at step 4024 can propagate the Answer event to the calling party side so that the call can continue.

Figure 4E:
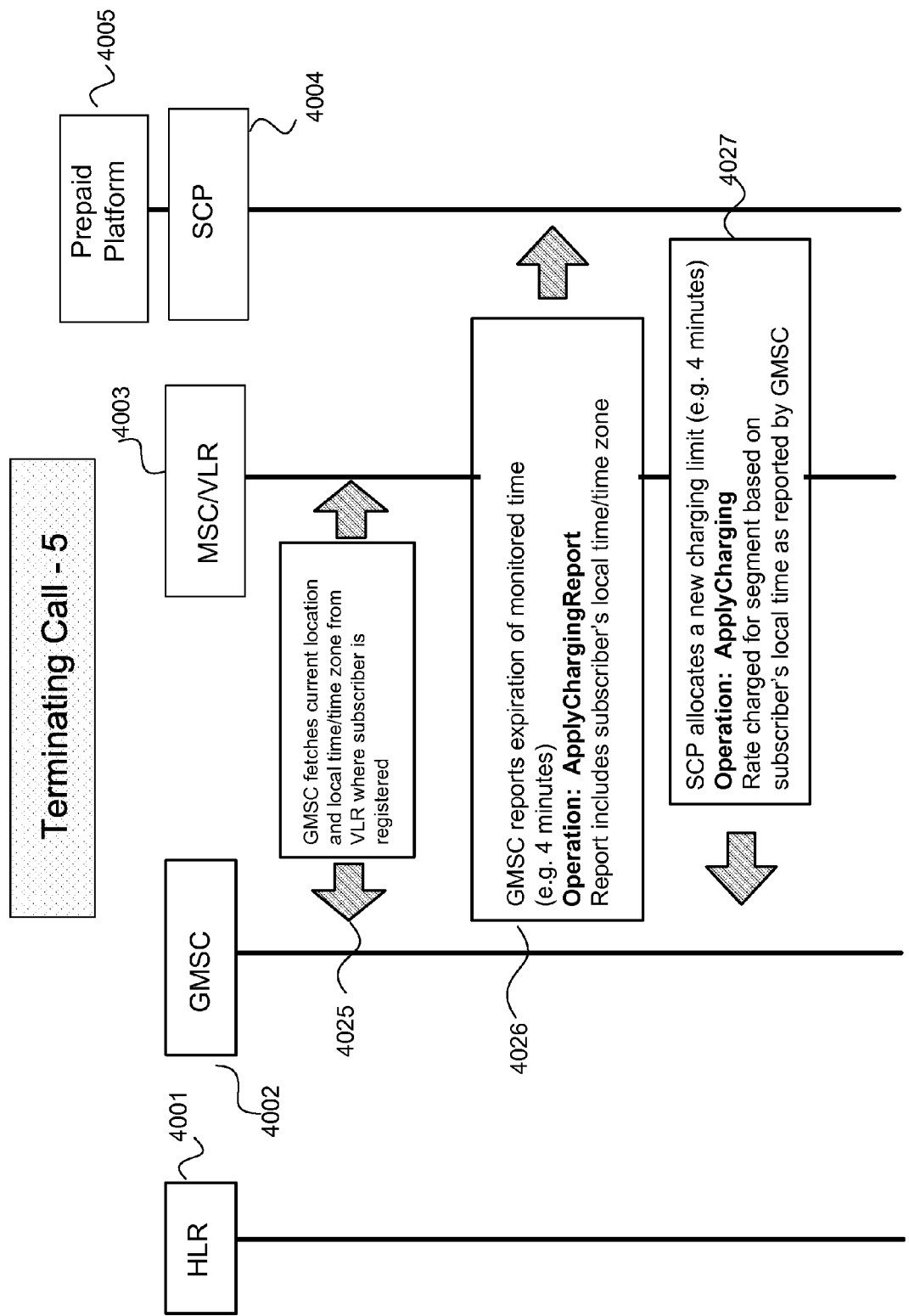

As seen in FIG. 4E, at step 4025, GMSC 4002 can also retrieve location and local time information regarding the terminating party from the VLR 4003 where the mobile terminating party is registered at one or more times during the course of the call. GMSC 4002 can receive this updated location information by means of messaging between the VLR where the subscriber is registered and GMSC 4002, for example, by means of one or more ISUP messages sent from the VLR to GMSC 4002. For example, VLR 4003 can send the subscriber's location and local time information to GMSC 4002 as part of an ISUP message such as a Call Progress Message (CPG) or a User-to-User Information Message between the VLR and the GMSC. Alternatively, before reporting the expiration of the allocated charging time limit, GMSC 4002 can send an ISUP message such as an Information Request Message (INR) to VLR 4003, identified at call setup, to obtain current subscriber information. VLR 4003 can then respond to the INR to provide GMSC 4002 with the subscriber's current location and local time information. If the subscriber has moved to a location served by a different MSC, in a manner known in the art, VLR 4003 remains in the call and can provide information on the new location and local time of the subscriber. In either case, the original VLR 4003 can send an ISUP message such as an Information Message (INF) containing updated location and local time information back to GMSC 4002 in response to the INR from the GMSC.

Regardless of the type of message used, the information sent by the VLR to GMSC 4002 can identify a location of the subscriber at that time, for example, by a CGI of the cell currently serving the mobile subscriber, an LAC of a group of cells including the cell currently serving the subscriber, or an MSC serving the cell and group of cells where the subscriber is located, and can provide a local time of the subscriber based on, for example, the MSC where the subscriber is registered. If an MSC spans more than one time zone, for example, is in an area covering a border between the Eastern Standard Time zone and the Central Standard Time zone, the subscriber's local time can be based on a more granular location, such as a LAC or CGI of the actual cell where she is located.

For example, after the expiration of the initial 4-minute charging time limit allocated in step 4023, at step 4026 GMSC 4002 can report a status of the call to SCP 4004 via Operation: ApplyChargingReport. The report from GMSC 4002 to SCP 4004 can contain information that the monitored time has expired and can request an additional allocation of time to continue the call. In addition, GMSC 4002 can include one or more additional parameters in the ApplyChargingReport message to provide information regarding a location and a local time of the terminating prepaid subscriber to SCP 4004. Thus, in accordance with aspects herein, an ApplyChargingReport from GMSC 4002 to SCP 4004 can include updated information regarding a local time or time zone of the mobile subscriber at the expiration of that call segment, and GMSC 4002 can forward this updated location information to SCP 4004 each time it reports to SCP 4004 that the most recent time period allocated for the call has expired so that SCP 4004 can have updated location information for every call segment in a prepaid mobile call.

SCP 4004 can use this updated time information to set a rate for a next segment of the terminating call (for example, a peak or an off-peak rate) or to determine whether the terminating subscriber is eligible to continue with another charging period, for example, because the terminating prepaid subscriber's account balance is sufficient to cover a charge for the next period based on the rate to be charged or because the subscriber is subject to a special promotion at that time. SCP 4004 and Rating Engine 1010C (shown in FIG. 1) in Prepaid Platform 4005 can set a rate to be charged for a new time period according to the updated local time information received from GMSC 4002 in the ApplyCharging Report. For example, if the local time information indicates that the local time is a "peak" time, a "peak" rate can be charged for the next allocated time period, whereas if the location and local time information indicates that she has moved to new time zone so that the local time is one hour earlier in the morning, an "off-peak" rate, which can be different from the "peak" rate, can be charged. If the terminating prepaid mobile subscriber's prepaid account balance is sufficient to cover an additional period based on the charge to be applied for that period or the prepaid terminating party is otherwise eligible to continue the call, at step 4027, SCP 4004 can allocate a new charging time limit for the call, for example, another 4 minutes, and can advise GMSC 4002 of this new charging limit via a second iteration of Operation: ApplyCharging. In this way, eligibility and charging of calls to the prepaid mobile subscriber can be determined based on information of her most current local time provided as part of the regular messaging from GMSC 4002 to SCP 4004 and without the need for any special messaging traffic between GMSC 4002 and SCP 4004 to provide that information.

In addition, the granularity of the time-based rate changes to be applied can easily be adjusted by changing the length of the charging time segments, and thus the time between local time updates received by the SCP. For example, if a location of the mobile subscriber reported at call setup is one that is close to a border between time zones, the charging limit time segment can be changed from 4 minutes to 2 minutes to ensure that the subscriber's local time is accurately reflected in the charge for the next segment. Alternatively, if the subscriber's location information indicates that her local time will be the same for a long time, for example because she is in the middle of a large state that is entirely within a single time zone, the charging time segments can be changed from 4 minutes to 8 minutes or longer for less-frequent and less granular local time updates.

Figure 4F:
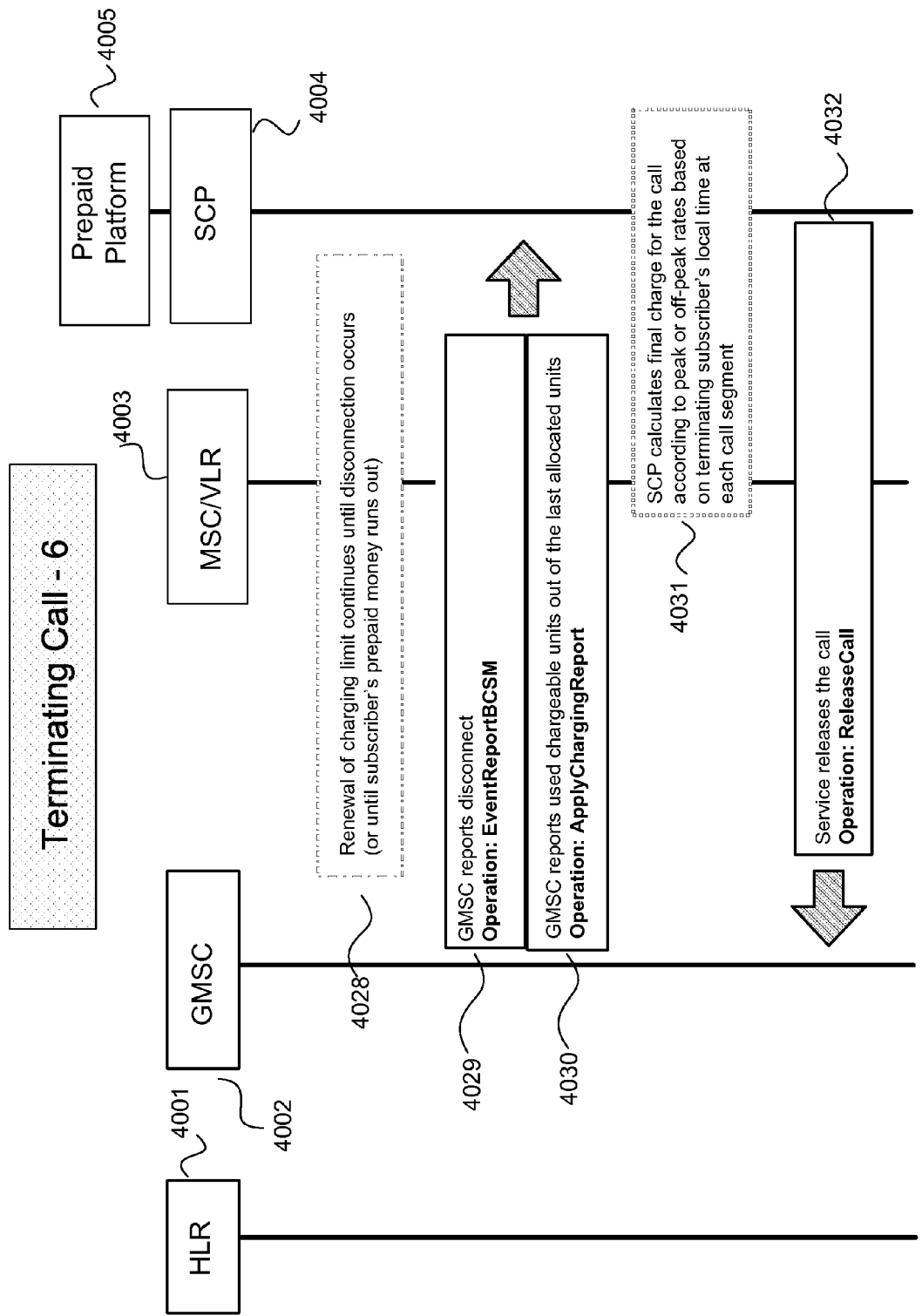

As seen in FIG. 4F, in step 4028, the allocation, monitoring, and renewal of charging limits seen in steps 4023, 4026, and 4027 and the retrieval of local time information seen in step 4025 can continue until the call is terminated, either because the parties end the call or because the prepaid subscriber is no longer eligible to make the call, for example, because she has exceeded her prepaid account balance or no longer enjoys the benefit of a special promotion. Upon the occurrence of either of these events, disconnection of the call can occur and at step 4029 GMSC 4002 can report disconnection of the call to SCP 4004 via Operation: EventReportBCSM. At step 4030 by way of Operation: ApplyChargingReport GMSC 4002 can report the mobile subscriber's most recent location and local time information in a manner as described above and can also report the chargeable time units used out of the last time units allocated for the call to SCP 4004. Based on the time and location information reported in step 4030, at step 4031, SCP 4004 can calculate the final charge for the call which can be deducted from the prepaid subscriber's prepaid balance and can instruct Prepaid Platform 4005 to debit the prepaid subscriber's account accordingly. After the call and charging for the call have been completed, at step 4032, SCP 4004 can instruct GMSC 4002 to release the call via Operation: ReleaseCall and call processing can stop until the prepaid mobile subscriber places or receives another call.

Thus, as described herein, it can be possible to provide a Service Control Point in a CAMEL network with updated information regarding a local time or time zone of a prepaid mobile subscriber on a regular basis during a call without requiring special signaling traffic between the Mobile Switching Center/Gateway Mobile Switching Center and the Service Control Point to provide this information. In addition, the granularity of the time-based reporting to be made can easily be adjusted by changing the length of the charging time segments provided in CAMEL call processing and thus changing the time between local time updates received by the SCP. For example, the charging limit time segment can be changed from 4 minutes to 2 minutes for more frequent and more granular local time updates or from 4 minutes to 8 minutes or even longer for less-frequent and less granular local time updates. Also, because local time information is more readily available to a Prepaid Platform and a Rating Engine, it can be possible to set more accurate time-based charging for a call.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

I claim:

1. A method for determining a capability to provide dynamic local time updates for a call using a system including a visiting location register, the method comprising:
    in response to an indication of a preference to receive dynamic updates of information received in a first message received from a mobile switching center, sending a requesting message, by a home location register to said visiting location register, requesting information of a capability of said visiting location register to dynamically provide, during a call, a most recent time information associated with a mobile subscriber engaged in the call, the most recent time information including at least one of a most recent local time and a most recent time zone associated with the mobile subscriber; and
    receiving, at said home location register, a message from said visiting location register indicating said capability of said visiting location register to dynamically provide, during the call, said most recent time information;
    transmitting to the mobile switching center, a message from said home location register, indicative of said capability of said visiting location register, said message being one of a message indicative of presence of a capability to dynamically provide, during the call, said most recent time information and a message indicative of an absence of a capability to dynamically provide said most recent time information,
wherein the capability includes periodically providing during the call, after a terminating party answers and prior to disconnection of the call, the most recent time information associated with the mobile subscriber engaged in the call.

2. The method according to claim 1, further comprising:
transmitting the first message by the mobile switching center to said home location register.

3. The method according to claim 1, wherein the mobile subscriber is a prepaid mobile subscriber in the telecommunications network.

4. A method comprising:
selectively configuring a switching center to dynamically update information associated with a prepaid mobile subscriber, the selectively configuring being in response to a call request to the prepaid mobile subscriber and at least partially based on a capability of a visiting location register associated with the prepaid mobile subscriber to dynamically provide the information during a call,
wherein the information includes at least one of location and local time information associated with the prepaid mobile subscriber;
sending a first message from the switching center to a home location register associated with the prepaid mobile subscriber, the message requesting capability information regarding the capability of the visiting location register to dynamically provide the information during the call, the requesting being in response to an indication of a preference of a mobile switching center to receive dynamic updates of information;
receiving by the home location register, from the visiting location register, information indicative of said capability of the location register in response to a request from the home location register; and
sending, by the home location register, a message to the switching center indicative of said capability of said visiting location register, said message being one of a message indicative of presence of a capability to dynamically provide, during the call, said most recent time information and a message indicative of an absence of a capability to dynamically provide said most recent time information,
wherein the capability includes periodically providing during the call, after a terminating party answers and prior to disconnection of the call, the most recent time information associated with the prepaid mobile subscriber engaged in the call.

5. The method as recited in claim 4, further comprising:
reporting the information associated with the prepaid mobile subscriber to a service control point by the switching center in response to an expiration of a time period when the switching center is configured to dynamically update information associated with the prepaid mobile subscriber; and
charging a rate for the call at least partially based on the information associated with the prepaid mobile subscriber.

6. An apparatus comprising:
a visiting location register comprising a processor, the visiting location register being configured to provide to a home location register, in response to receiving a capability inquiry, an indicator of capability of the visiting location register to dynamically update, during a call, information associated with a prepaid mobile subscriber, in response to a call request to the prepaid mobile subscriber,
wherein the information includes at least one of location and local time information associated with the prepaid mobile subscriber, and
wherein the capability includes periodically providing during the call, after a terminating party answers and prior to disconnection of the call, the most recent time information associated with the prepaid mobile subscriber engaged in the call,
wherein the capability inquiry is received by the visiting location register from the home location register in response to a first message from the switching center to a home location register associated with the prepaid mobile subscriber,
the message indicating a preference of the switching center to receive dynamic updates of information,
the capability inquiry requesting capability information regarding the capability of the visiting location register to dynamically provide the information.

7. The apparatus as recited in claim 6,
wherein the switching center is configured to provide to the service control point information dynamically updated by the visiting location register in response to an event associated with a call to the prepaid mobile subscriber.

8. The apparatus as recited in claim 7, further comprising:
the home location register configured to send the capability inquiry to the visiting location register in response to the first message, the capability inquiry requesting capability information regarding the capability of the visiting location register to dynamically provide the information.

9. The apparatus as recited in claim 8, further comprising:
a service control point configured to receive the information associated with the prepaid mobile subscriber from the switching center in response to an expiration of a time period when the switching center is configured to dynamically update information associated with a prepaid mobile subscriber,
wherein the service control point is configured to determine a charging limit for the call at least partially based on the information associated with the prepaid mobile subscriber.

* * * * *